United States Patent [19]
Kemerer et al.

[11] Patent Number: 5,700,495
[45] Date of Patent: Dec. 23, 1997

[54] CONTINUOUS 3-D FORMING MACHINE FOR FORMING THREE-DIMENSIONAL PRODUCTS FROM THERMOPLASTIC MATERIALS

[75] Inventors: W. James Kemerer, Mission Viejo; Clyde W. Vassar, deceased, late of Carlsbad, both of Calif., by Jean F. Vassar, administrator

[73] Assignee: Kemcast Partners-1989, Mission Viejo, Calif.

[21] Appl. No.: 628,810

[22] Filed: Apr. 5, 1996

Related U.S. Application Data

[60] Division of Ser. No. 167,197, Dec. 13, 1993, Pat. No. 5,505,599, which is a continuation-in-part of Ser. No. 72,490, Jun. 4, 1993, Pat. No. 5,330,341, which is a division of Ser. No. 843,362, Feb. 25, 1992, Pat. No. 5,244,618, which is a division of Ser. No. 506,072, Apr. 6, 1990, Pat. No. 5,167,781.

[51] Int. Cl.$^6$ .................................................. B29C 43/48
[52] U.S. Cl. ................ 425/190; 425/195; 425/371; 100/151; 100/154; 156/583.5
[58] Field of Search .................. 100/151, 154; 156/555, 583.3, 583.5; 264/167, 171.1; 425/4 C, 134, 182, 190, 195, 335, 367, 371, 384

[56] References Cited

U.S. PATENT DOCUMENTS

| | | | |
|---|---|---|---|
| 3,852,387 | 12/1974 | Bortnick et al. | 425/371 |
| 3,910,179 | 10/1975 | Troutner | 425/371 |
| 3,914,084 | 10/1975 | Kornylak | 425/371 |
| 3,993,426 | 11/1976 | Ahrweiler et al. | 425/371 |
| 4,149,840 | 4/1979 | Tippmann | 425/371 |
| 4,826,560 | 5/1989 | Held | 425/371 |
| 5,167,781 | 12/1992 | Kemerer et al. | 425/371 |
| 5,244,618 | 9/1993 | Kemerer et al. | 425/371 |
| 5,330,341 | 7/1994 | Kemerer et al. | 425/371 |
| 5,458,477 | 10/1995 | Kemerer et al. | 425/371 |
| 5,505,599 | 4/1996 | Kemerer et al. | 425/4 C |

Primary Examiner—C. Scott Bushey
Attorney, Agent, or Firm—Parmelee & Bollinger, LLP

[57] ABSTRACT

Continuous 3-D forming machine using upper and lower revolving endless, flexible, forming belts produces three-dimensional patterned products from heated thermoplastic material. The mold belts revolve synchronously in elongated oval paths around their respective carriages moving in opposed face-to-face relationship defining one or more travelling mold channels progressing from an entrance to an exit. Formable heated thermoplastic material feeds into the entrance, and attractive 3-D products proceed from the exit. Revolving mold surfaces are operated at least 25° F. above room temperature, for example in a range of 110° F. to 140° F., for providing aesthetic surface qualities on products having content which may be foamed to densities in the range of about 0.9 to about 0.4. Thermoplastics in such travelling mold channels are appropriately chilled when differentials ΔT in degrees Fahrenheit between mold surface temperatures T2 and temperatures T1 of heated entering thermoplastics are greater than T2: T1−T2=ΔT>T2. Mold belts shown have silicone rubber molds bonded to five-ply plastic fabric and plastic resin backing belts sliding along slippery-plastic-covered platens having air-film lubrication and cooling of friction heat. Vacuum holds the revolving upper belt up against its overlying platen. Exit ends of carriages are shown extendable/retractable at least 25 inches for handling belts sized at 16, 18 or 20 circumferential feet. Removable bridges span gaps near extended exit ends of each carriage for supporting and guiding revolving mold belts travelling over these bridges.

13 Claims, 13 Drawing Sheets

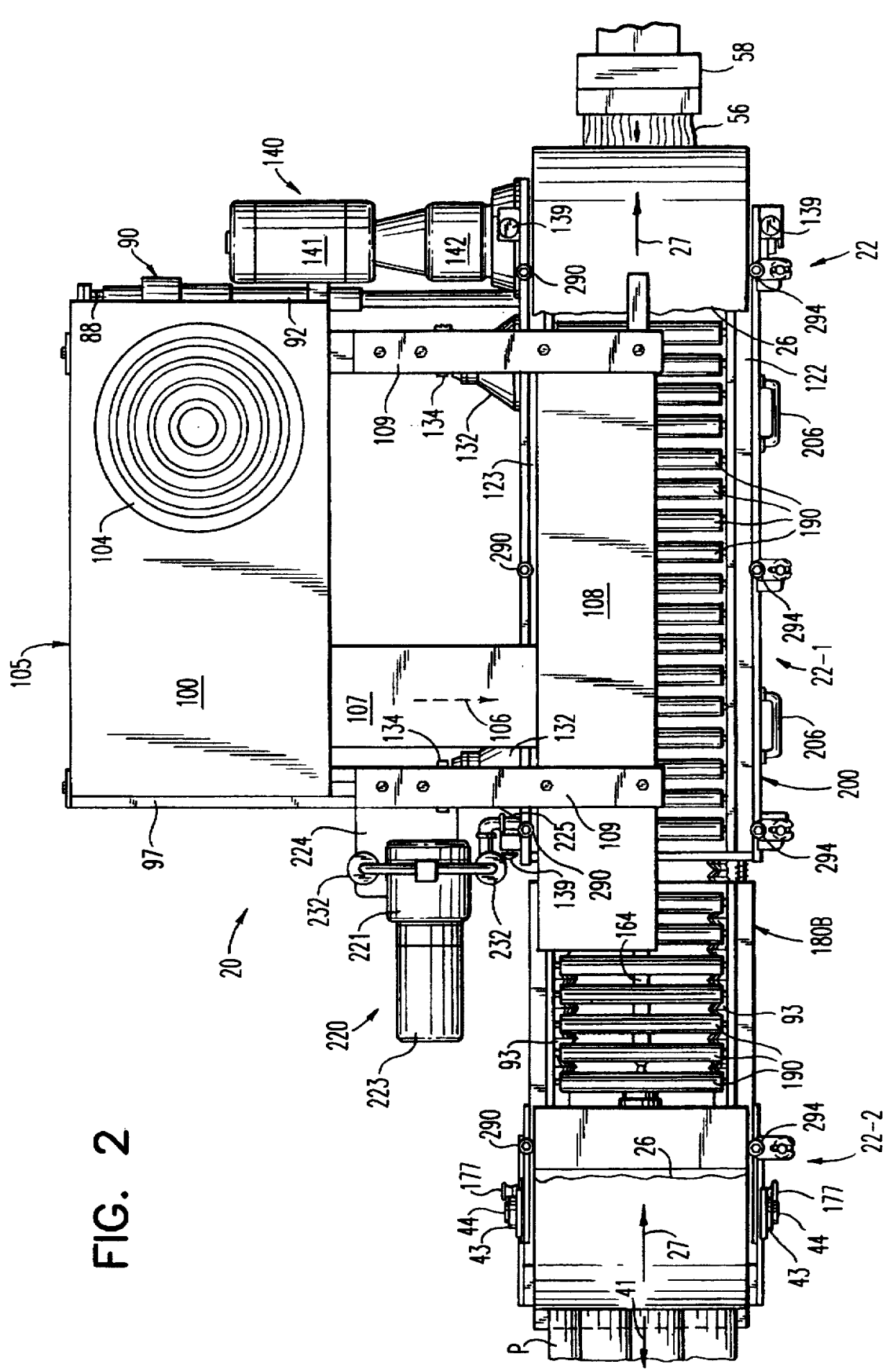

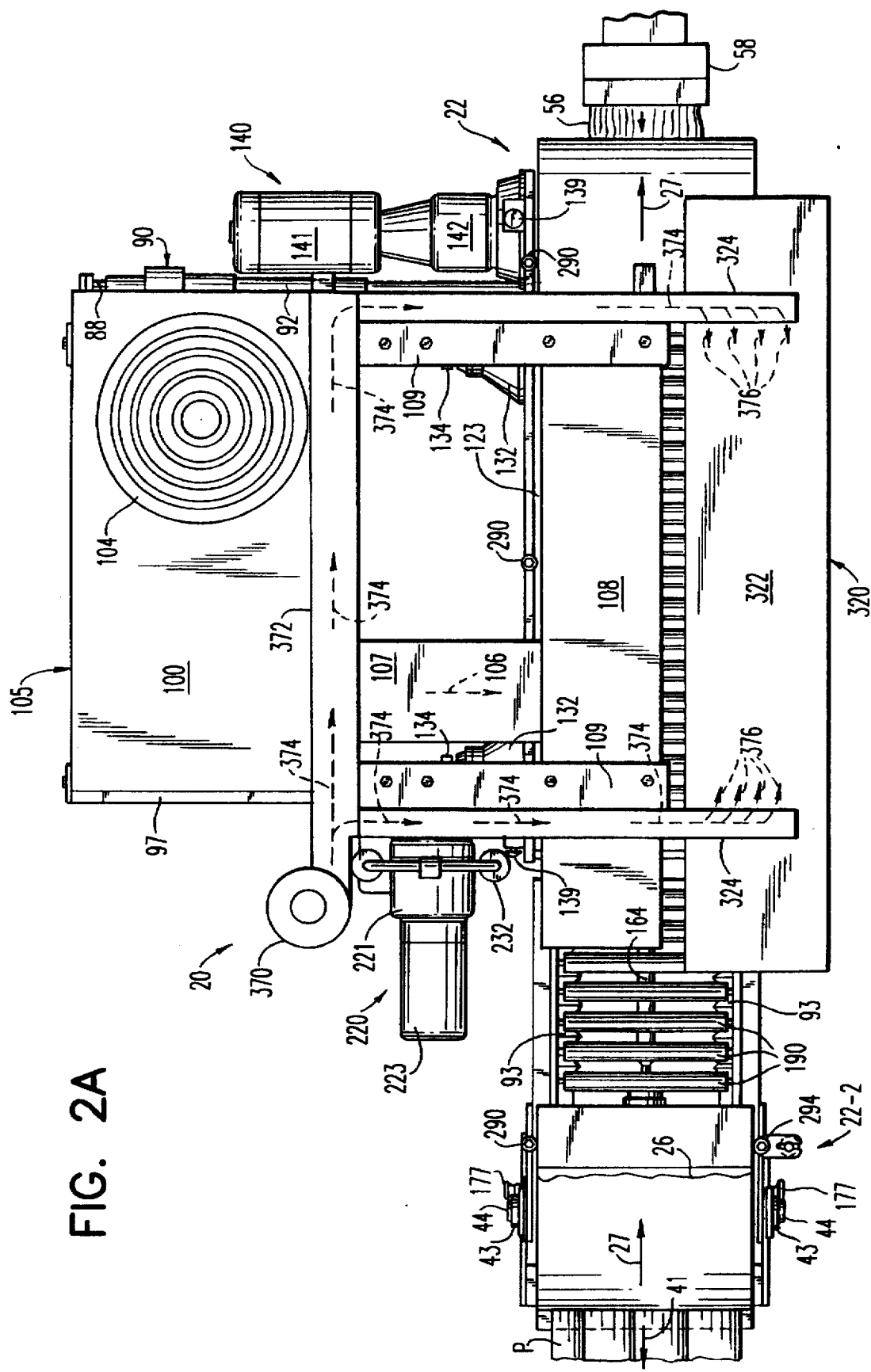

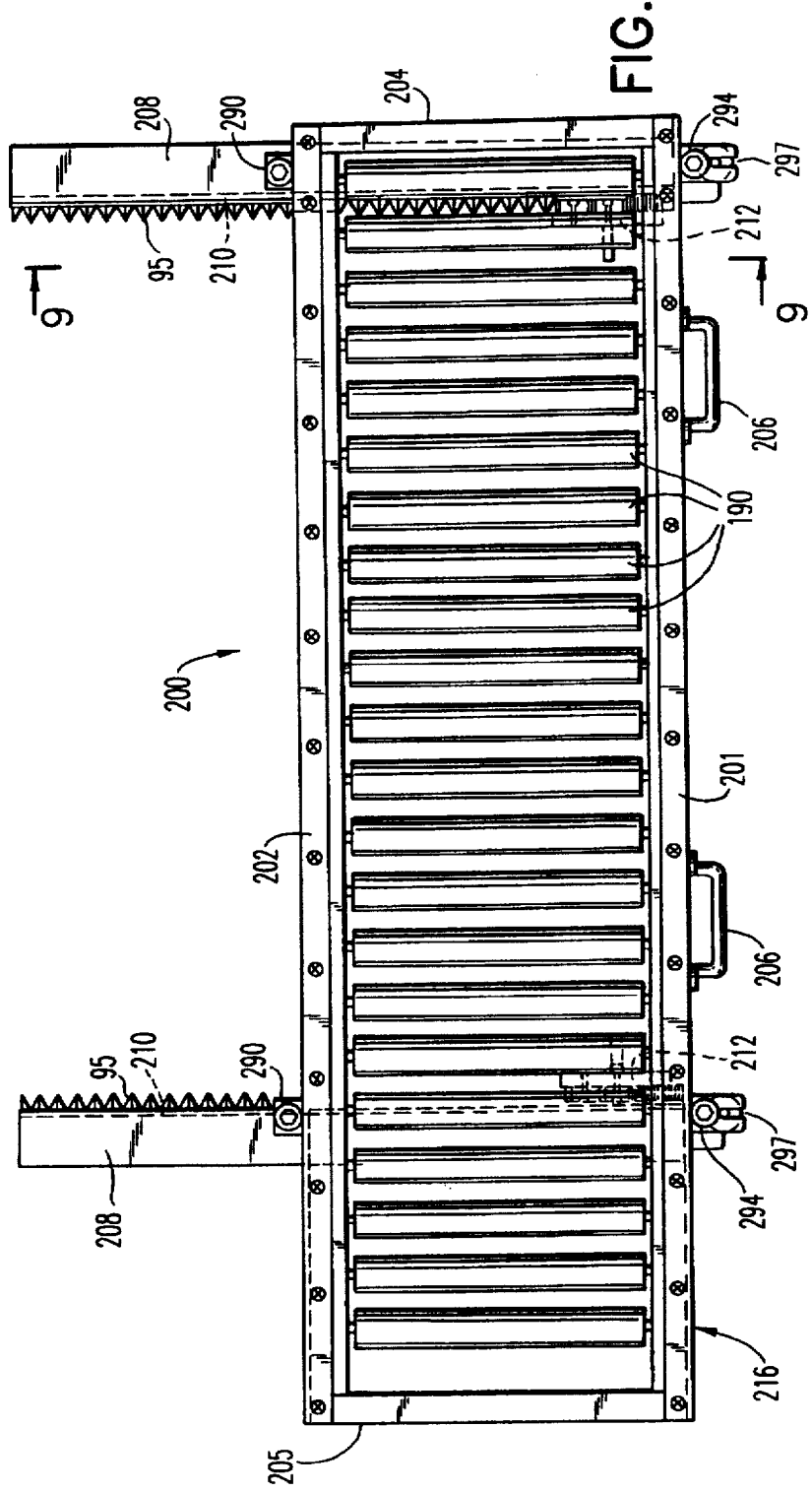
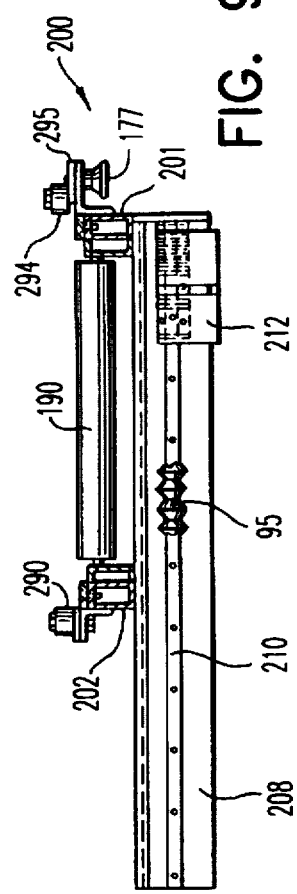

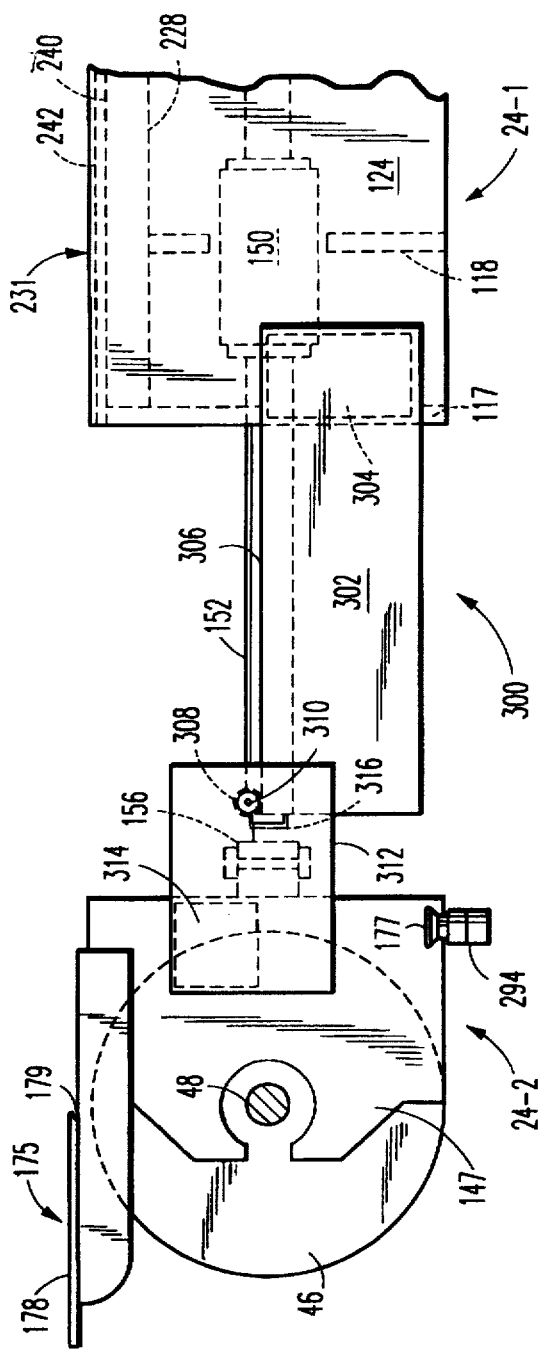
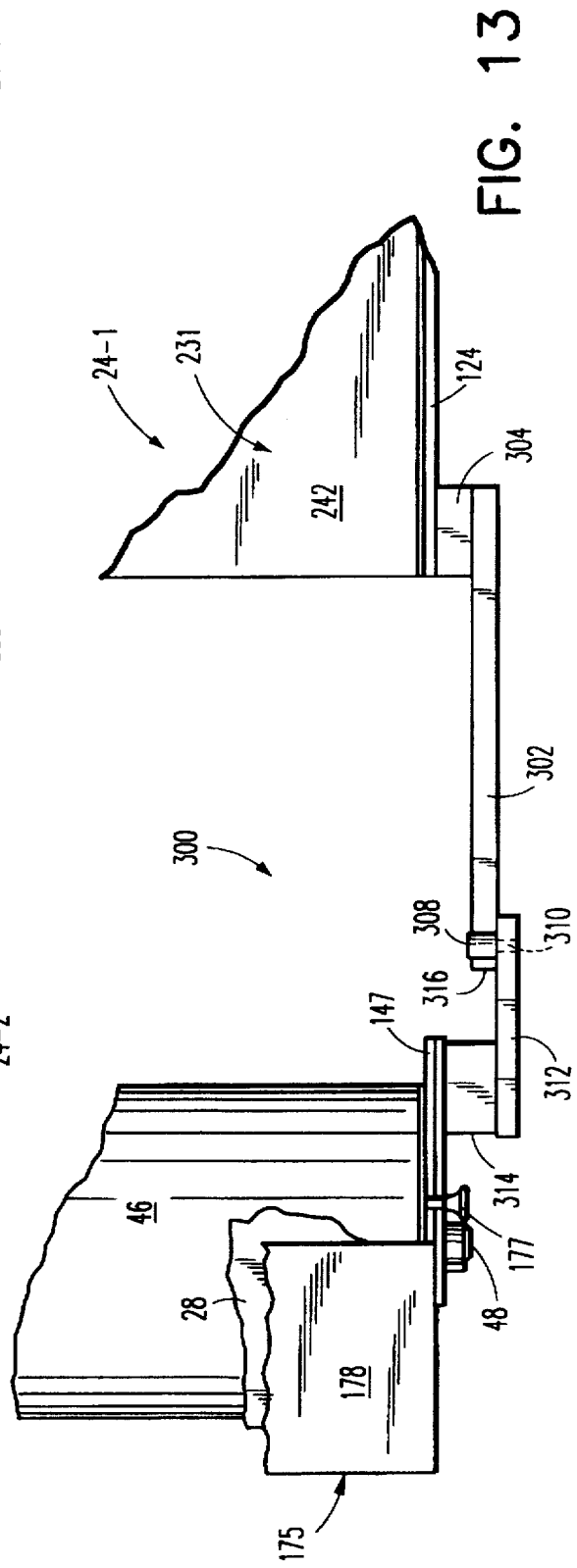
FIG. 12
FIG. 13

CONTINUOUS 3-D FORMING MACHINE FOR FORMING THREE-DIMENSIONAL PRODUCTS FROM THERMOPLASTIC MATERIALS

RELATED APPLICATIONS

The present application is a Division of application Ser. No. 08/167,197, filed Dec. 13, 1993, now U.S. Pat. No. 5,505,599 issued Apr. 9, 1996, which is a Continuation-in-Part of prior application Ser. No. 08/072,490 filed Jun. 4, 1993 now U.S. Pat. No. 5,330,341 issued Jul. 19, 1994, and which is, a Division of Ser. No. 07/843,362 filed Feb. 25, 1992, which issued as U.S. Pat. No. 5,244,618 on Sep. 14, 1993, a Division of Ser. No. 07/506,072 filed Apr. 6, 1990, which issued as U.S. Pat. No. 5,167,781 on Dec. 1, 1992.

FIELD OF THE INVENTION

The present invention is in the field of continuous forming apparatus for forming thermoplastic materials and more particularly relates to continuous 3-D forming machines and endless flexible forming belts for forming three-dimensional products from thermoplastic materials.

BACKGROUND

An apparatus and process for forming products from thermoplastic polymeric materials, such products having three-dimensional patterns and surface textures, were disclosed in U.S. Pat. Nos. 4,128,369 and 4,290,248, both of which are hereby incorporated by reference.

In the apparatus and process disclosed in said patents thermoplastic material to be formed was heated above its glass transition temperature before introduction between two opposed travelling flexible mold belts, which were being revolved in opposed relationship. The flexible mold belts each included a thin, flexible sheet-metal layer of relative high thermal conductivity. At least one sheet-metal layer had a rubber mold bonded thereon for providing a flexible three-dimensional patterned mold formed on the front face of the mold belt. When two such mold belts were revolved in opposed relationship along their respective upper and lower oval paths with their mold surfaces in opposed face-to-face relationship both moving at the same speed, the two mold belts provided a travelling mold channel between their mold surfaces.

At the entrance to the travelling mold channel opposed nip rolls pressed the upper and lower revolving mold belts against entering hot thermoplastic material in a progressive localized rolling, squeezing action in the nip region. Thereafter, a series of backup rollers arranged along the travelling mold channel held the moving mold belts against the impressed hot plastic material located between them for maintaining the impression while being cooled.

Mold belts were shown in those patents as each including a wide, thin, endless, flexible sheet-metal layer, at least two-feet wide. At least one of two opposed mold belts had a wide, flexible mold formed of a heat-resistant material, such as rubber, bonded to the thin metal layer. In practice, the mold belts in the prior disclosed apparatus each included an extremely thin sheet-steel layer, being typically 0.025 to 0.075 of an inch thick. The thin steel layer was the inside surface layer of the flexible mold belt and had a silicone rubber mold bonded onto the outside of the thin steel layer for providing a three-dimensional patterned mold surface. The steel layer, being on the inside of the mold belt, revolved in contact with large diameter metal pulleys, i.e., a steel layer running in direct contact with a metal-surface pulley. Such an extremely thin steel layer located on the inside surface of a revolving mold belt is susceptible to dents, crimped edges and rust. Also, such a thin steel layer on the inside surface of a flexible revolving mold belt presents difficulties in maintenance of alignment in travelling over metal pulleys.

In the prior disclosed apparatus, many small-diameter backup rollers arranged along the travelling mold channel were rolling in contact with the thin steel layer of each of the opposed mold belts. These small-diameter rollers caused the travelling, opposed, upper and lower, revolving flexible mold belts to experience considerable fluctuations in contact pressures against the thermoplastic material located between them as they successively passed over roller-gap-roller-gap-roller, etc.

In practice, the prior disclosed apparatus utilized cooling liquid (water which may contain corrosion-inhibitors) applied to the back (inside surface) of the thin, thermally-conductive sheet-steel layer of both mold belts. The numerous small-diameter backup rollers were arranged to permit such liquid coolant to flow along the sheet-steel layer of each mold belt for extracting heat through this metal layer of the mold belt. After the thermoplastic material product had become sufficiently cooled to retain its impressed three-dimensional patterns, the revolving mold belts separated from the continuously formed 3-D product as the product progressed out from an exit end of the apparatus.

The prior disclosed apparatus utilized hydraulic actuators to tension the mold belts, provide a compressive force to maintain contact of the two opposed, travelling mold belts, and to lift the upper mold assembly off of the lower mold assembly to facilitate maintenance and the changing of mold belts.

As is well known in the art, hydraulic actuators require the use of a motor, pump, various hoses and valves, and actuator cylinders. The hydraulic system must be maintained in a leak-free condition in order to function properly and prevent contamination of the molded product. Hydraulic systems constantly consume electrical energy when the apparatus is operative. That is, the hydraulic motor and pump must be running often in order to provide pressure to maintain and change positions of the hydraulic actuators during operation of such continuous 3-D forming apparatus. The motor and hydraulic pump are inherently noisy and commonly are located in close proximity to the apparatus, which makes the working environment of such prior apparatus uncomfortable.

SUMMARY

The following description and drawings disclose a new, further improved continuous 3-D forming machine and further improved endless flexible belt molds for continuous forming of products from thermoplastic polymeric material. These continuously formed 3-D products have attractive, natural-appearing three-dimensional patterns and surface textures. Among such formed 3-D plastic products are those which are intended to simulate the attractive appearance of natural wood products. Compared with wood products, the 3-D formed plastic products have advantages of weather resistance, rot resistance, enhanced fire rating, built-in colors or built-in wood tones. In addition, nails or screws can be driven through locations close to the edges or ends of these 3-D formed plastic products without causing splitting; whereas, nails or screws driven through similar locations in corresponding wood products usually cause splitting of the wood.

The process and apparatus disclosed in U.S. Pat. Nos. 4,290,248 and 4,128,369 were originally described in patent applications filed more than seventeen years prior to this application. Since then much has been learned, product design specifications have become more demanding, and new technology has become available. The further improved machine with further improved mold belts embodying the present invention produces continuously 3-D formed plastic products having closer tolerances on a less-costly machine. The machine is easier to maintain, uses less energy, is less expensive to operate, and is quieter in operation.

Among the advantages provided by the present continuous 3-D forming machine are those arising from the fact that temperatures of the three-dimensional patterned surfaces of the mold belts are controlled within a relatively narrow optimum range of operating temperatures. This optimum range of operating temperatures of the patterned mold surfaces depends upon characteristics of the particular plastic materials being 3-D formed. Usually this optimum temperature range of the patterned mold surfaces is at least 25° F. above room temperature to produce a product with the best physical and aesthetic properties. Thus, prior to running a continuous 3-D forming operation on heated thermoplastic material, the molding surfaces of the two mold belts are not cooled. Instead, both mold surfaces are warmed up (pre-heated) into a desired predetermined temperature range by revolving both belts at their predetermined operating speed and by blowing heated air onto their mold surfaces as they revolve. The preheating of the mold surfaces shortens the start-up time, improves product quality, and reduces scrap. After the mold surfaces have been pre-heated, thermoplastic material at its predetermined operating temperature may be fed into the travelling mold channel for a brief start-up time until the temperature of the moving mold surfaces is stabilized within a controlled optimum temperature range as will be explained later. During this brief start-up time, 3-D formed product which exits from the machine may be shunted aside, later to be re-melted and recycled or discarded.

In experiments involving continuous 3-D forming of various heated thermoplastic materials, we have learned that measured temperatures of moving mold surfaces of revolving mold belts can vary under similar circumstances depending upon (i) type of pyrometer being used and (ii) size of the area being scanned (sensed) by the pyrometer. Therefore, in understanding optimum operating temperature ranges stated for moving mold surfaces, it is important to note that remote-sensing, infrared-scanning sensors were being used to obtain indicated temperatures. Two primary factors to consider in selecting an operating temperature range for forming a particular product are: (1) the differential between the temperature of heated thermoplastic material being fed in between revolving mold belts and the temperature of the revolving mold surfaces and (2) the ability to keep revolving mold surfaces at essentially constant temperature. In addition to considering these primary factors, the operating conditions also should be chosen with a view to producing a product having the best physical and aesthetic properties.

Among further advantages provided by the present continuous 3-D forming machine are those arising from the fact that the perforated, air-film-lubricated and cooled backup platens are covered by slippery, low-friction plastic material, for example PTFE "Teflon" plastic material, having reinforcing glass fibers incorporated therein. For example, this slippery plastic material has about 25% by weight of embedded glass fiber reinforcement. The air-film lubrication and cooling of the friction-heat in the interface region between the slippery-plastic-covered platen and the inside surface of the mold belt travelling thereover is provided by low pressure air having sufficient pressure for providing the desired air-film lubrication and desired cooling of the friction-heat without distorting or bulging the travelling mold belt.

Additional advantages of the present continuous 3-D forming machine are provided by the fact that a central longitudinal region of the upper mold belt is supported and held up against its superposed platen by suction for preventing sagging or distortion of a molding channel C due to gravitational force acting on the upper mold belt as the rather heavy upper mold belt travels longitudinally along beneath the slippery surface of the superposed upper platen. For example, a mold belt may weigh 100 to 500 lbs., depending upon its width, circumferential length and its 3-D molding depths, surface patterns and configurations. Additionally, a central longitudinal region of the lower mold belt may be held down by suction, if desired, against its underlying platen for stabilizing the lower belt as the lower belt travels longitudinally along the slippery surface of the underlying lower platen. It appears from experiments that weight of the lower mold belt is sufficient for holding it down, but suction is available for holding down the lower belt, if an operator wants to use it.

Moreover, the drive pulley rolls are rubber-covered for increasing frictional contact between the drive-roll surface and the inside surface of the mold belt so that synchronization of the revolving upper and lower mold belts with their mold surfaces travelling at the same speed in opposed face-to-face relationship along the moving mold channel is accomplished by drive-motor control, for example by employing controllable-speed or controllable-torque electric motor drives, such as brushless DC drive systems.

Further advantages are provided by bonding a silicone rubber mold onto an essentially non-stretchable multi-ply plastic fiber and plastic resin backing belt, for example, a five-ply backing belt. The rubber mold together with its multi-ply non-stretchable plastic backing belt is shaped to provide square shoulders along both edges of each mold belt. Then, the front edge-guide rollers are adjustable in position, while the rear edge-guide rollers are fixed in position. These front and rear edge-guide rollers are located at spaced intervals along both edges of both top and bottom mold belts for guiding the mold belts as they travel together in contact with each other for thereby accurately defining and stabilizing the continuously moving mold channel. Each edge-guide roller engages both the edge of the silicone rubber mold and also the edge of the non-stretchable multi-ply backing belt to which the silicone rubber mold is bonded.

Other advantages involve a capability for relatively large adjustments in the overall lengths of the upper and lower oval paths being travelled by the respective upper and lower mold belts. An exit end of an upper carriage and also an exit end of a lower carriage are extendable or retractable over significant distances for accommodating various endless lengths of mold belts for continuous 3-D forming of products of various pattern repetition lengths. For example, these exit ends are extendable and retractable for accommodating mold belt lengths over a range from 16 feet to 20 feet. Removable spanning bridges are inserted into the extended ends of both carriages for accommodating longer mold belts. These spanning bridges are replaced by shorter ones of these bridges, or they are removed entirely, for accommodating respective intermediate and shorter lengths of mold belts.

Moreover, return travels of the upper and lower mold belts are supported by multiple rollers for preventing sagging of each returning mold belt moving along its return path. The multiple belt-return-support rollers for the lower belt are mounted in a pull-out frame. This pull-out frame can be pulled out like a drawer to its full width in a lateral direction relative to the longitudinal direction of the travelling mold channel. The pull-out drawer facilitates mold belt changes by bearing the weight of the lower mold belt once the lower carriage exit end has been retracted.

BRIEF DESCRIPTION OF THE DRAWINGS

The invention, together with further objects, features, advantages and aspects thereof, will be more clearly understood from the following detailed description considered in conjunction with the accompanying drawings which are not drawn to scale with the emphasis instead being placed upon clearly illustrating the principles of the invention. Like reference numerals indicate like elements or like components throughout the different views.

The accompanying drawings, which are incorporated in and constitute a part of the specification, illustrate a presently preferred embodiment of the invention and, together with the general description set forth above and the detailed description of the preferred embodiment set forth below, serve to explain the principles of the invention. In these drawings:

FIG. 2 is a top plan view of the machine of FIG. 1 with the electrical control panel and its housing removed for clearly revealing the configuration of the machine itself minus its electronic control housing. Also, the upper mold belt is shown broken away for showing the return-travel-support rollers for the upper mold belt as it travels along its return path.

FIG. 2A is a top plan view similar to FIG. 2, except that FIG. 2A includes a showing of the control housing and its mounting attachments with a cooling blower for cooling the interior of the control housing.

In FIG. 3, the left side is the front of the machine, and the right side is the back of the machine.

In FIG. 4, the right side is the front of the machine, and the left side is the back of the machine.

FIG. 8 is a plan view of the pull-out frame in which are mounted multiple return-travel-support rollers for supporting the lower belt as it moves along its return path from the exit end to the entrance end of the machine.

FIG. 9 is a cross sectional view of the pull-out frame of FIG. 8 as seen looking along the plane 9—9 in FIG. 8.

FIG. 11 shows the advantageous elongated diagonal seam in the silicone rubber mold.

FIG. 12 is a partial side elevational view of the machine of FIG. 1 for showing a lower exit end roll stabilizer.

FIG. 13 is a partial plan view as seen looking down in FIG. 12 for showing features of the lower exit end roll stabilizer.

DETAILED DESCRIPTION OF PREFERRED EMBODIMENT

Figure 1:
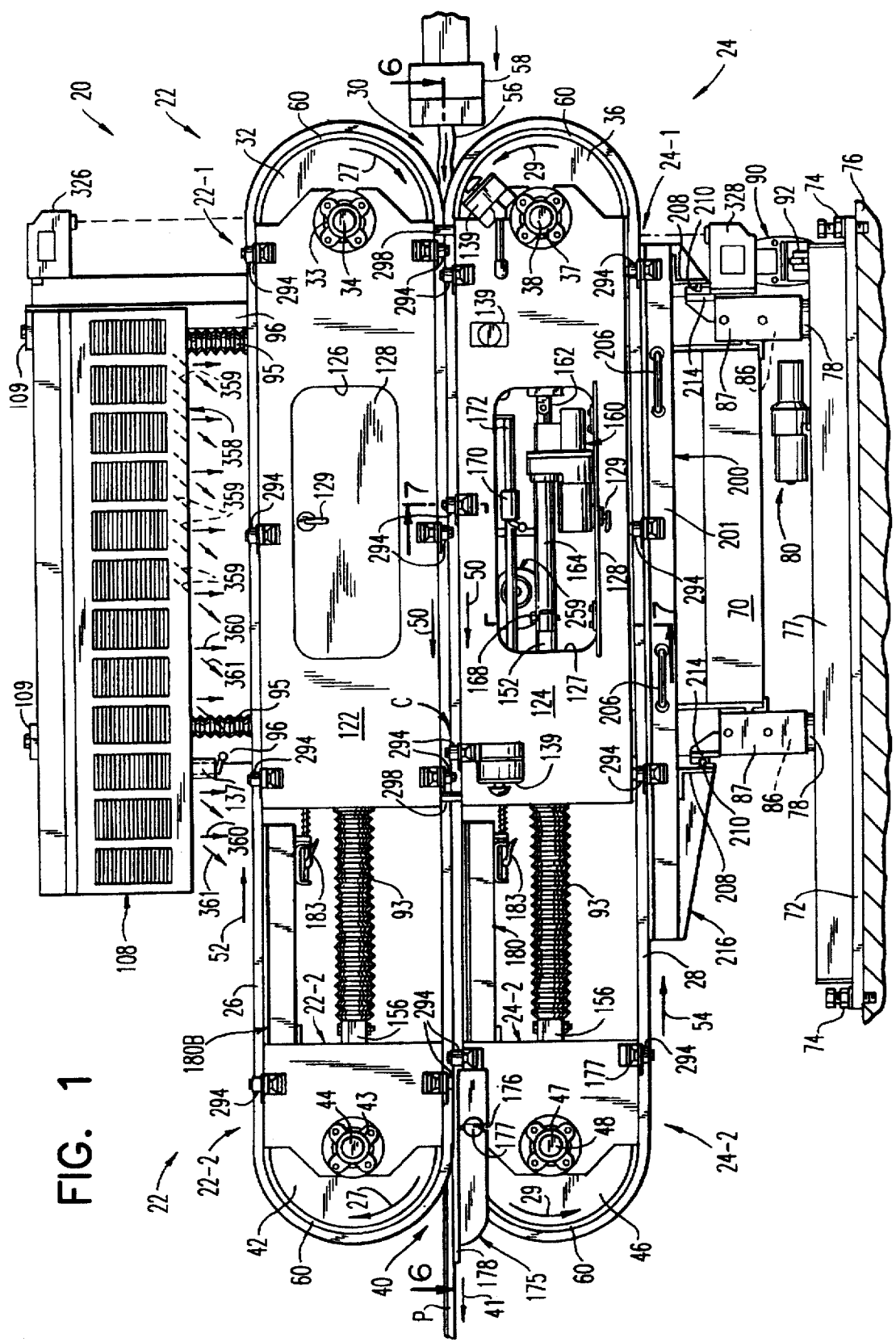
FIG. 1 is a longitudinal front elevational view of a continuous 3-D forming machine for thermoplastic materials embodying the present invention. An electrical control panel with its control housing has been removed from this FIG. 1 for clearly revealing a louvered grille and other features of mold-belt-temperature-control mechanisms which serve for controlling the temperature of the revolving upper mold belt. This electrical control panel with its control housing extends horizontally at a convenient elevation, for example in a range of 8 inches to 12 inches, above the revolving upper mold belt to provide space to raise the top carriage for accommodating mold belt changes and servicing.
Figure 1A:
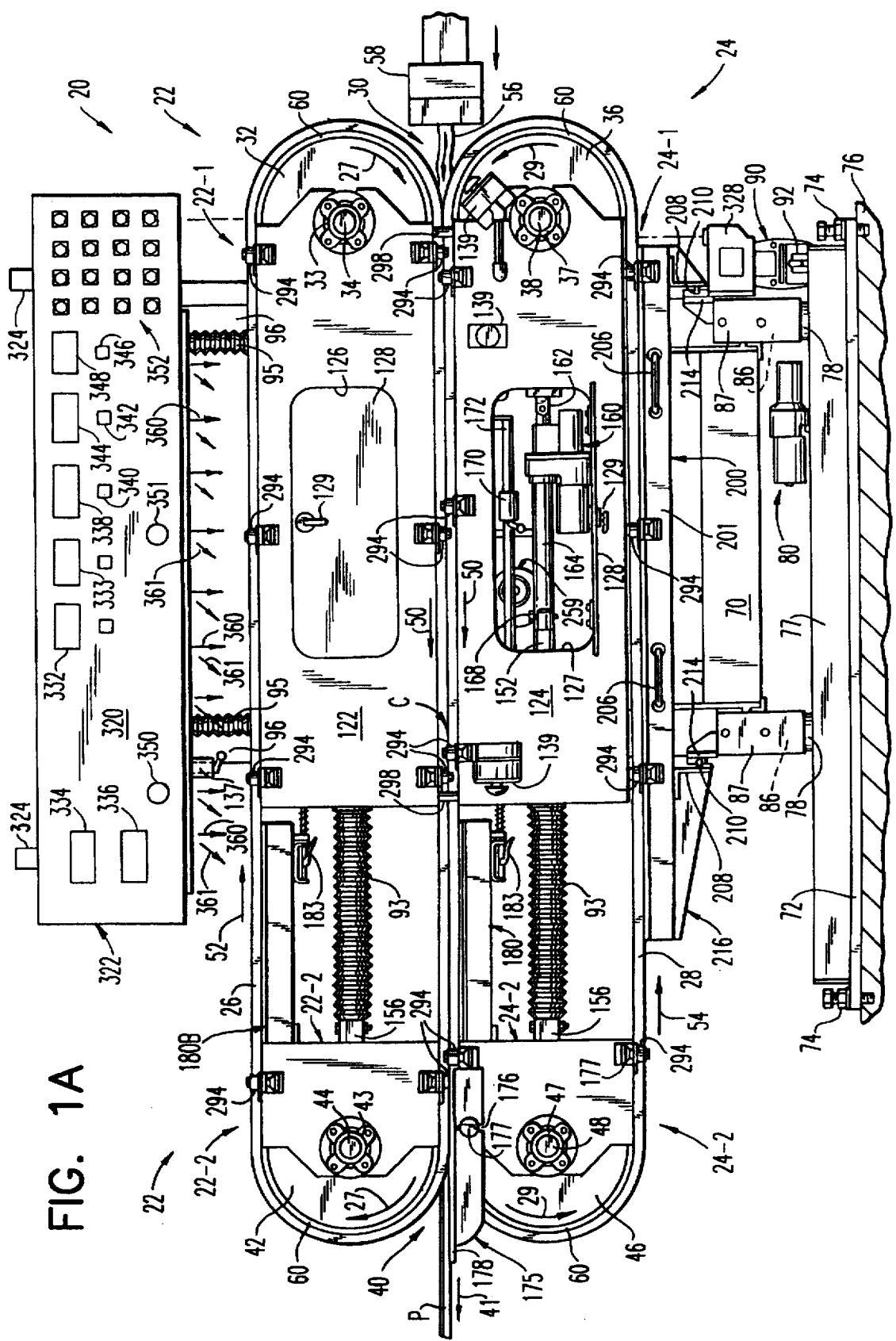
FIG. 1A is a front elevational view similar to FIG. 1, except that FIG. 1A includes a showing of the control panel with its control housing mounted in its normal position at a convenient elevation above the revolving upper mold belt.

In FIGS. 1 and 1A is shown a continuous 3-D forming machine, generally indicated at 20, for continuously forming products from heated thermoplastic material. The 3-D formed products have attractive three-dimensional patterns and surface textures and may have a wide variety of useful configurations, depending upon the 3-D patterned mold surfaces of two removable and replaceable revolving, flexible mold belts, as will be explained.

This machine 20 includes upper and lower belt carriages, generally indicated at 22 and 24. Around these carriages during operation of the machine are revolved upper and lower flexible mold belts 26 and 28, each travelling in its oval path as shown by motion arrows 27 and 29. The oval paths around the upper and lower carriages 22 and 24 are established by pulley rolls located at an entrance end and an exit end of each carriage. Each of these pulley rolls has an axle shaft with its two ends rotatably mounted in suitable bearings. In FIG. 1 only one of such bearings for each axle is seen. At an entrance or input end 30 of the machine, is seen an upper nip pulley roll 32 having an end of its axle shaft 34 rotatably mounted by a bearing 33 on the entrance end of the upper carriage 22. A lower nip pulley roll 36 is shown having an end of its axle shaft 38 rotatably mounted by a bearing 37 on the entrance end of the lower carriage 24. At an exit or output end 40 of the machine 20 is seen an upper exit pulley roll 42 having an end of its axle shaft 44 rotatably mounted by a bearing 43 on an extendable and retractable exit end 22-2 of the upper carriage 22. A lower exit pulley roll 46 is shown with an end of its axle shaft 48 rotatably mounted by a bearing 47 on an extendable and retractable exit end 24-2 of the lower carriage 24.

During operation of the machine, the upper and lower mold belts are revolved in opposite directions as shown by arrows 27 and 29 travelling along their respective upper and lower oval paths with their mold surfaces moving at the same speed in opposed face-to-face relationship as shown by paired arrows 50 for defining between them a travelling mold channel C. This travelling mold channel C is continuously moving from the entrance 30 to the exit 40 of the machine. Then, at the exit 40 the mold belts separate from a 3-D formed product P which progresses out from the exit end 40 of the machine 20 as shown by an arrow 41. After the upper mold belt 26 has separated from the exiting product P, this upper mold belt travels half-way around the upper exit pulley roll 42 as shown by the arrow 27, and then this upper mold belt returns toward the entrance 30 by travelling along a return travel path 52 moving toward the upper nip pulley roll 32. Upon reaching this nip pulley roll 32, the upper mold belt travels half-way around it as shown by the other arrow 27 and then moves into the entrance 30 into the travelling mold channel C, thereby completing its revolution around its oval path. In summary, the upper oval path proceeds from entrance 30 to 50 (for providing the travelling mold channel C) to exit 40 and then moving 27 around upper exit pulley roll 42 so as to travel along the return path 52 and then moving 27 around upper entrance pulley roll 32 and into the entrance 30.

After the lower mold belt has separated from the exiting product P, this lower mold belt passes half-way around the lower exit pulley roll 46 as shown by the arrow 29, and then this lower mold belt returns toward the entrance 30 by travelling along a return travel path 54 moving toward the lower nip pulley roll 36. Upon reaching this lower nip pulley roll 36, the lower mold belt travels half-way around this lower nip pulley roll as shown by the other arrow 29 and then moves into the entrance 30 into the travelling mold channel C, thereby completing its revolution around its oval path: In summary, the lower oval path proceeds from entrance 30 to 50 (for providing the travelling mold channel C) to exit 40 and then moving 29 around lower exit pulley roll 46 so as to travel along the return path 54 and then moving 29 around lower entrance pulley roll 36 and into the entrance 30.

In order to feed a ribbon or stream or streams 56 of heated thermoplastic material into the entrance 30 of the machine 20, suitable heated plastic feeding means 58 are employed. The heated ribbon or stream or streams 56 may be heated thermoplastic material alone or in conjunction with other plastic materials, which may be pre-heated, heated, or at room temperature and which may be thin, surfacing films or laminates which are intended to conform with and adapt to the 3-D patterns in the travelling mold channel or channels C for producing products P having enhanced surface or skin properties or laminated structures or both. For example, this feeding means 58 may comprise a continuous mixer for plastic materials or may comprise an extruder or both. Also, the feeding means 58 may comprise co-extruders for simultaneously feeding into the entrance 30 different types or different formulations of heated thermoplastic materials having different characteristics, for example for providing an external surface layer or surface film or skin on the products P which have improved weather resistance, while also providing an internal body for products P having lighter weight per unit volume or less cost than the external surface material. The ribbon or stream or streams 56 of heated thermoplastic material may contain any suitable additives, colorants, foamants, fillers, fibers, reinforcement elements, etc., which are compatible with the thermoplastic material 56 and also compatible with the feeding means 58 and with the revolving mold belts 26 and 28 and which are appropriate for meeting the specifications for products P.

In operation, the relative position of the continuous 3-D forming machine 20 and the feeding means 58 is adjusted for the machine 20 to be aligned with and as close as necessary to the feeding means 58. In this embodiment of the invention, the machine 20 is adjustable in position, as will be explained later, for accommodating the machine 20 to an existing location of the feeding means 58. Moreover, the mold surfaces of the mold belts 26 and 28 may be configured for providing a plurality of travelling mold channels C. Thus, for example the machine 20 may be adjusted in lateral position relative to the feeding means 58 for feeding heated thermoplastic material 56 into a first of the travelling mold channels C for continuously producing a first product P. Then, after a desired inventory of the first product P has been made, the machine 20 may be shifted laterally for feeding the heated thermoplastic material into a second of the travelling mold channels C for continuously producing a second product P. At other times, all product channels C may be fed simultaneously. Thus, lateral shiftability of the machine 20 advantageously provides capability for quickly and easily changing over from producing a first product to producing a second product, and vice versa, as marketing opportunities for various products may arise. Also, as will be explained, the mold belts are removable and replaceable by other mold belts for continuously 3-D forming of other products P as marketing occasions may arise.

By employing more than one feeding means 58 positioned side-by-side, heated thermoplastic material may be fed simultaneously into more than one travelling mold channel C for simultaneously producing more than one product P with the two revolving mold belts 26 and 28. By positioning multiple feeding means 58 side-by-side or one above the other more than one type or composition of thermoplastic material may simultaneously be fed into the same travelling mold channel C for producing the product P comprising more than one type or composition of material.

As the heated thermoplastic material 58 enters the entrance 30, this plastic material becomes squeezed in a nip region located between the two flexible mold belts as they revolve 27, 29 into the entrance 30, thereby three-dimensionally forming the material 56 as the mold belts pass between the upper and lower nip pulley rolls 32 and 36 pressing the edges of these revolving flexible mold belts together and forming the entering plastic material 56 to fill completely the mold cavity formed by the top and bottom mold belts for producing accurate, full-detailed, high-fidelity, attractive 3-D forming of the products P. An advantageous, progressive, localized, rolling-squeezing action occurs in this nip region between the revolving mold belts 26 and 28 in entering and moving between upper and lower nip pulley rolls 32 and 36 at the entrance 30 to the travelling mold channel C. Moreover, by virtue of the fact that these nip pulley rolls 32 and 36 each have a relatively thick covering 60 of fiber-reinforced rubber and the mold belts each have a stretch-resistant multi-ply plastic belt backing instead of a steel layer, it appears that sharper, more precise and more accurate 3-D patterns are impressed into the heated thermoplastic material 56 than occurred with prior continuous 3-D forming machines, thereby providing products P which have even more attractive surface patterns and even more natural configurations than were obtained heretofore.

LONGITUDINALLY AND LATERALLY ADJUSTABLE POSITIONING OF THE MACHINE 20

As discussed briefly above, the position of the machine 20 can be adjusted longitudinally for providing appropriate spacing between the entrance nip region 30 and the heated thermoplastic feeding means 58. Also, the machine can be adjusted laterally for obtaining alignment between the feeding means 58 and one travelling mold channel C or for obtaining alignment with a selected one or more of a plurality of spaced, parallel, side-by-side travelling mold channels C. For providing this longitudinal and lateral adjustment, a frame 70 of the machine 20 is movably mounted above a base 72, as will be explained. This base 72 is rectangular and has four level-adjusting screw jacks 74 positioned at its corners. These screw jacks 74 serve to level the base 72 on a floor 76, and each screw jack includes a locknut for securing its adjusted position.

For longitudinal adjustment of the frame 70 relative to the base 72, there are a pair of spaced parallel rails 77 extending longitudinally along the base 72, and linear motion bearings 78 ride longitudinally along these rails.

In order to move the linear motion bearings along their rails 77, there is an electric screw jack 80 (FIG. 1) mechanically interconnected with these bearings by a hinged linkage (not seen) which is similar to a hinged linkage for a lateral motion electric screw jack which soon will be described. This electric screw jack 80 has an elongated telescoping feedscrew (not seen), and a remote (distal) end of this feedscrew is anchored by a clevis 82 (FIG. 4) which is fixed in position on the base 72 by an anchoring connection 84. When the electric screw jack 80 is energized for extending its telescoping feedscrew, this feedscrew pushes against the fixed clevis 82 for moving the bearings 78 longitudinally along their rails 77 toward the right in FIG. 1 for the machine 20 to approach the feed means 58. Conversely, when the jack 80 is energized for retracting its feedscrew, this feedscrew pulls against the fixed clevis 82 for moving the bearings 78 longitudinally along their rails 77 toward the left in FIG. 1 for increasing the distance between the machine 20 and the feed means 58 for allowing room for convenient servicing of the feed means 58. In FIG. 1 the machine 20 is shown in a location near the full extent of its travel along the rails 77 toward the right so that its entrance 30 is near the feed means 58.

For lateral adjustment of frame 70 relative to base 72, there are a pair of spaced parallel members 86 (FIGS. 3 and 4) extending laterally beneath the frame 70. The frame 70 is mounted on and is carried by these lateral members 86. These lateral members 86 contain linear-motion bearings (not seen) which, in turn, ride along laterally-oriented rails 89 (FIGS. 3 and 4) which in turn are carried by the longitudinally-oriented linear-motion bearings 78. In other words, the lateral-motion bearings contained by members 86 ride along rails 89 which are mounted directly upon and are carried by the longitudinal-motion bearings 78. These lateral-motion rails 89 are aimed at right angles to the longitudinal bearings 78 for allowing the lateral bearings contained by members 86 to ride back and forth along the lateral-motion rails 89.

To move the lateral rails 86 relative to their lateral-motion bearings 89, there is an electric screw jack 90 (FIG. 3) mechanically interconnected by a hinged linkage 88 with the frame 70. This electric screw jack 80 has an elongated telescoping feedscrew 92 with its distal end connected to a clevis 94 which is fixed to a longitudinal-motion bearing 78. When the electric screw jack 90 is energized for extending its feedscrew 92, this feedscrew pushes against its clevis 94 for moving the rails 86 and also the frame 70 toward the right (rearwardly) in FIG. 3. Conversely, when the jack 90 is energized for retracting its feedscrew 92, this feedscrew pulls against its clevis 94 for moving the rails 86 and also the frame 70 toward the left (forwardly) in FIG. 3.

It is noted that in FIG. 1 the two lateral-motion bearing members 86 are indicated by dotted lead lines, because the ends of these two members are hidden behind attachment plates 87 (FIGS. 3 and 4) which are secured to the frame 70. It is to be understood that the telescoping feedscrews of all electric screw jacks may be protected from dust and grit by surrounding each of them in an individual, pleated, accordian-like, protective, dust-proof, sleeve of light-weight plastic or impregnated-cloth, for example such as the sleeves shown at 93 in FIG. 1. Also, all of the rails for the respective linear motion bearings may be protected from dust and grit by enclosing each rail in a similar elongated, pleated, accordian-like, dust-proof cover, for example as shown at 95 in FIGS. 4 and 8.

Extending vertically up from and rigidly secured to the frame 70 are two spaced, parallel upright frame members 96.

HEATING AND COOLING EQUIPMENT

Figure 2B:
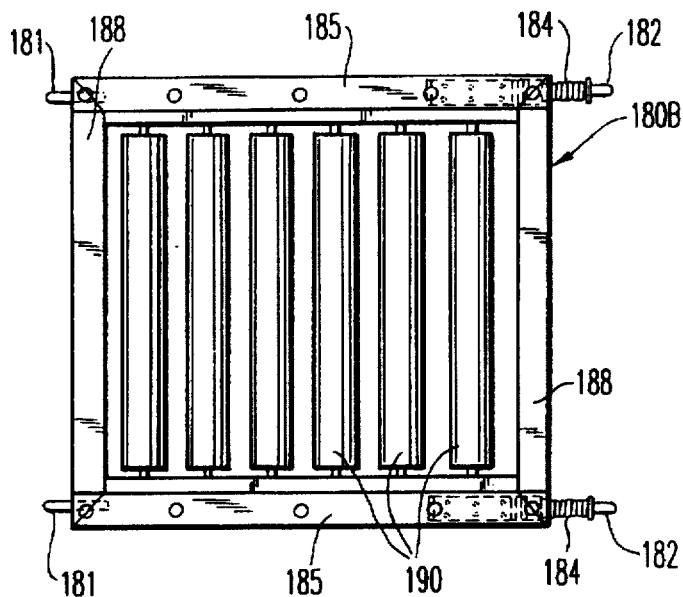
FIG. 2B is a top plan view of a removable bridge containing multiple rollers. This removable bridge is installed in the upper belt carriage, as shown most clearly in FIG. 2, when the exit end of the upper belt carriage is in a fully-extended operating position as shown in FIGS. 1, 1A, 2 and 2A for supporting the upper belt during its return travel.
Figure 2C:
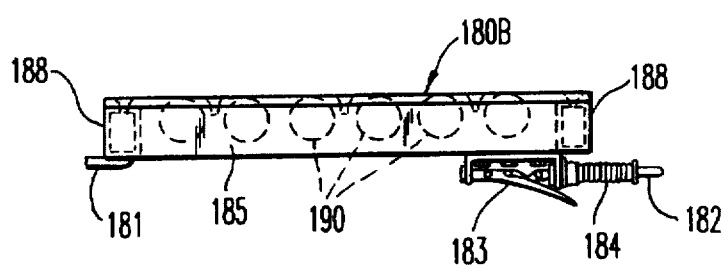
FIG. 2C is a side elevation of the removable bridge of rollers shown in FIG. 2B.
Figure 3:
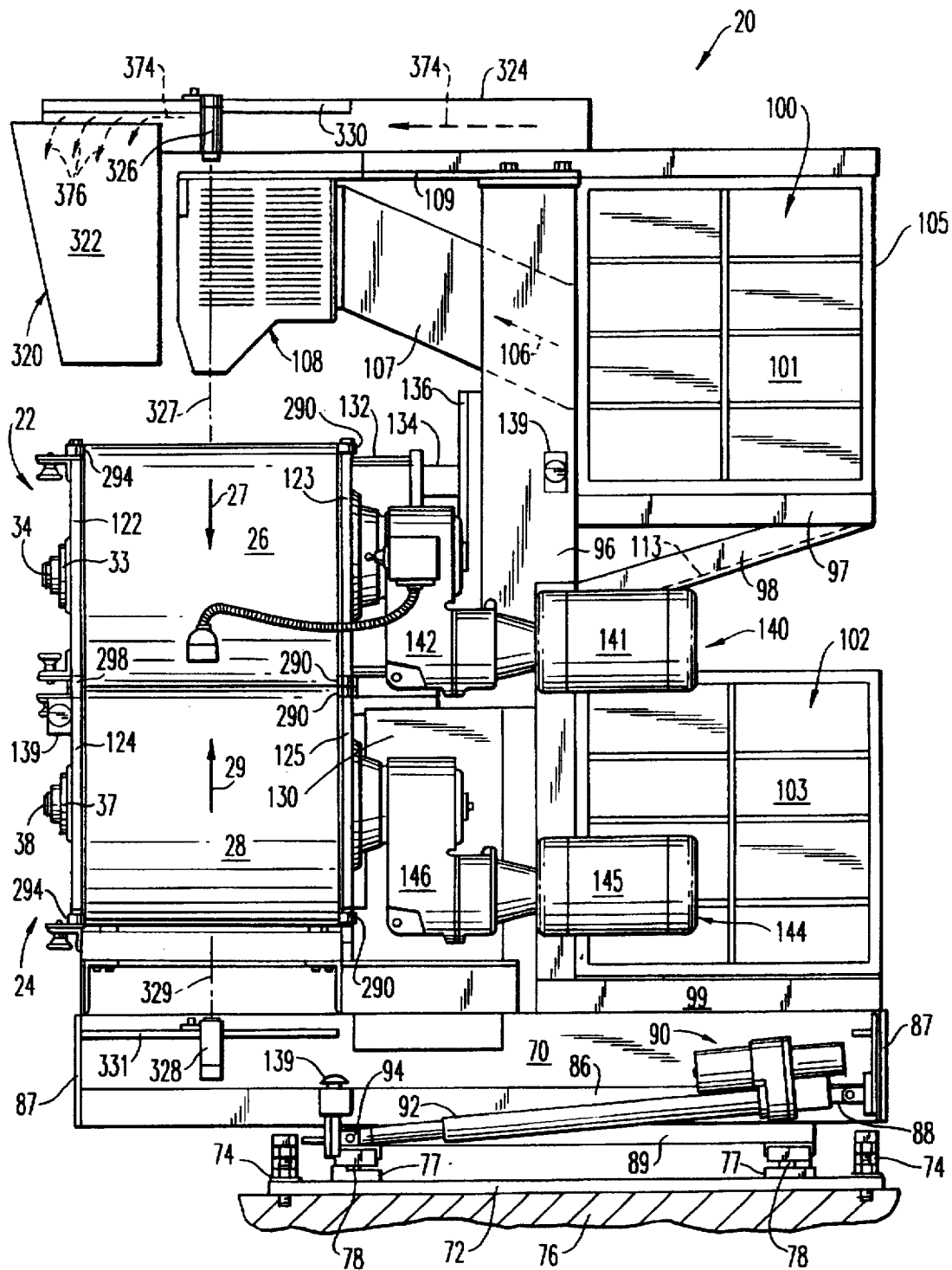
FIG. 3 is an elevational view of the entrance (input) end of the machine shown in FIGS. 1, 1A, 2 and 2A. The conveniently positioned, inclined, overhanging electrical control panel for the machine with its control housing are shown at the upper left in FIG. 3 located above the revolving upper mold belt.
Figure 4:
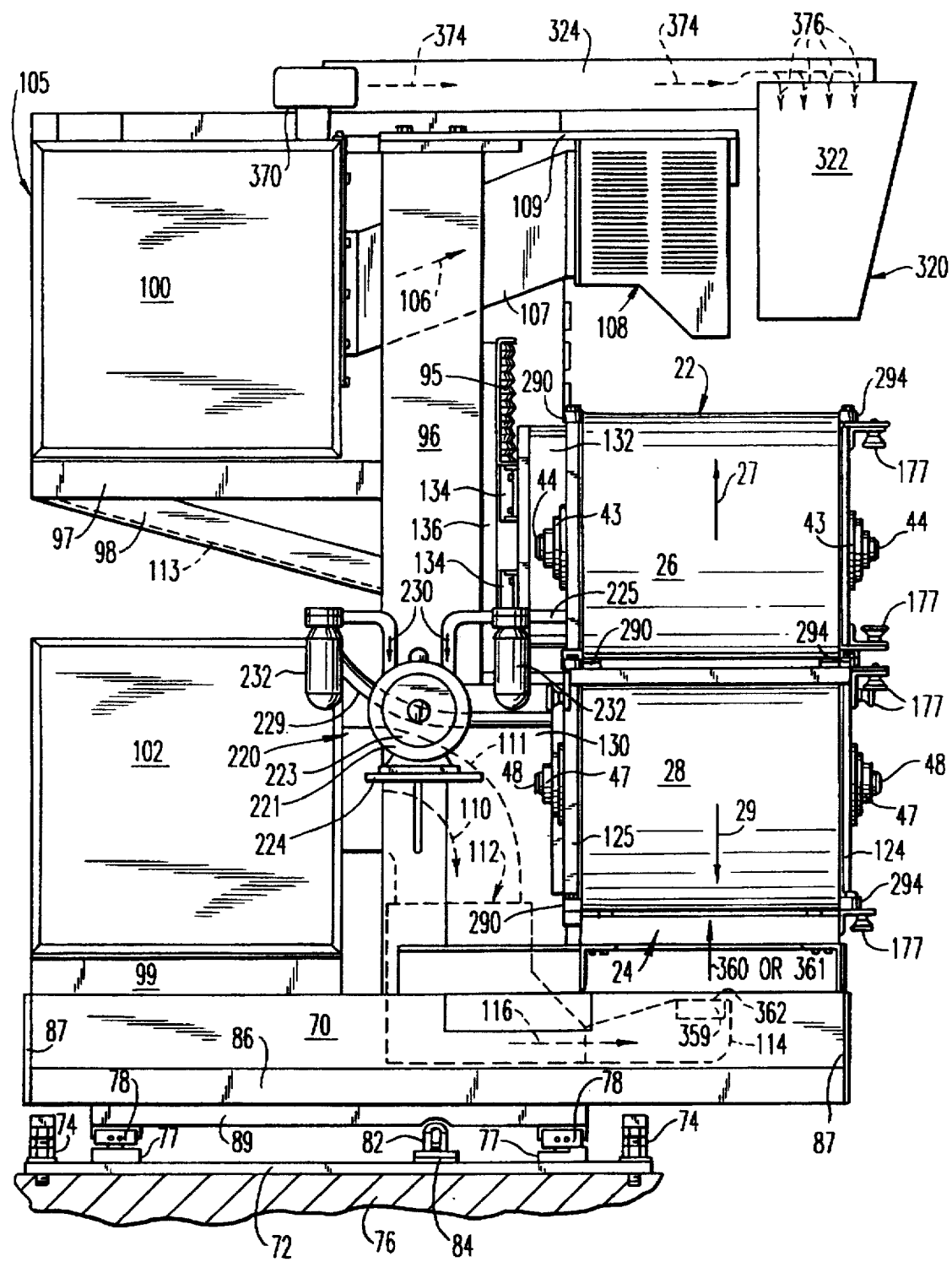
FIG. 4 is an elevational view of the exit (output) end of the machine shown in FIGS. 1–3.

Secured to the back of each of the upright frame members 96 is a horizontal shelf beam 97 (FIGS. 3 and 4) each of which is rigidly supported by a diagonal brace 98 secured to its upright frame member. The purpose of these horizontal shelf beams 97 is to support an upper air conditioner and heater (A/C-Heater) unit 100. This A/C-Heater unit 100 is seen in FIGS. 2, 3 and 4, being located at the rear of the machine 20. Mounted directly onto the frame 70 are two other horizontal shelf beams 99 (FIGS. 3 and 4) for supporting a lower A/C-Heater unit 102.

In FIG. 3 is shown an ambient air inlet grille 101 for entry of air used to remove heat energy from the upper A/C-Heater unit 100 when it is operating in its A/C mode. Another ambient air inlet grille is shown at 103 for entry of air used to remove heat energy from the lower A/C-Heater unit 102 when it is operating in its A/C mode. For example, each of these units 100 and 102 as shown may be commercially available A/C-Heater units each rated at 3 Ton cooling capacity with a heating capacity of 17,050 Btu per hour. In FIG. 2 is shown an outlet grille 104 at the top of the unit 100 through which is discharged air for carrying away heat energy from the unit 100 when this unit is operating in its A/C mode. This air discharged through outlet grille 104 previously was drawn in through grille 101.

It is noted that the lower A/C-Heater unit 102 also has a similar outlet grille (not seen) at its top through which is discharged air for carrying away heat energy when the lower A/C-Heater unit 102 is operating in its A/C mode. The air discharged through the outlet grille (not seen) on the top of the lower unit previously was drawn in through inlet grille 103. In order to protect the bottom of the upper unit 100 from direct contact by heated air discharged from the top of the lower unit 102, an upwardly inclined deflector shield 113 may be mounted between and generally aligned with the diagonal braces 98.

Air to be cooled or heated or left at room temperature by the upper A/C-Heater unit 100 is drawn in through an intake grille 105 located at the rear (right in FIG. 3 and left in FIG. 4). Whether cooling air flow or heating air flow or ambient air temperature flow is occurring depends on momentary settings of the operating controls as will be explained later, which in turn depends upon the existent operating temperatures of the mold surfaces of the revolving mold belts. The resultant air output 106 from this A/C-Heater unit 100 is supplied as shown by a dashed arrow 106 through an inclined duct 107 leading upwardly to an upper high-velocity booster blower 108. This blower 108 is supported from the tops of the two upright frame members 96 by a pair of horizontal support bars 109. This high-velocity booster blower 108 as shown may have an air curtain capacity of 2,430 cubic feet per minute (CFM) at "LOW" and 3,075 CFM at "HIGH". The purposes and operations of the upper A/C-Heater unit 100 and its booster blower 108 will be explained later.

Air output 110 from the lower A/C-Heater unit 102 (which may be cooled or heated or at ambient temperature) is supplied as shown by a dashed curved arrow 110 (FIG. 4) through a curved duct 111 leading downwardly to a lower high-velocity booster blower 112, which in turn feeds into an air distribution plenum 114 as shown by a dashed arrow 116. This lower high-velocity blower 112 as shown may have "LOW" and "HIGH" air curtain capacities identical with the upper blower 108. The purposes and operations of the lower unit 102 and its booster blower 112 and the air-distribution plenum 114 will be explained later.

UPPER AND LOWER BELT CARRIAGE STRUCTURES AND THEIR MOUNTING ARRANGEMENTS

Figure 7:
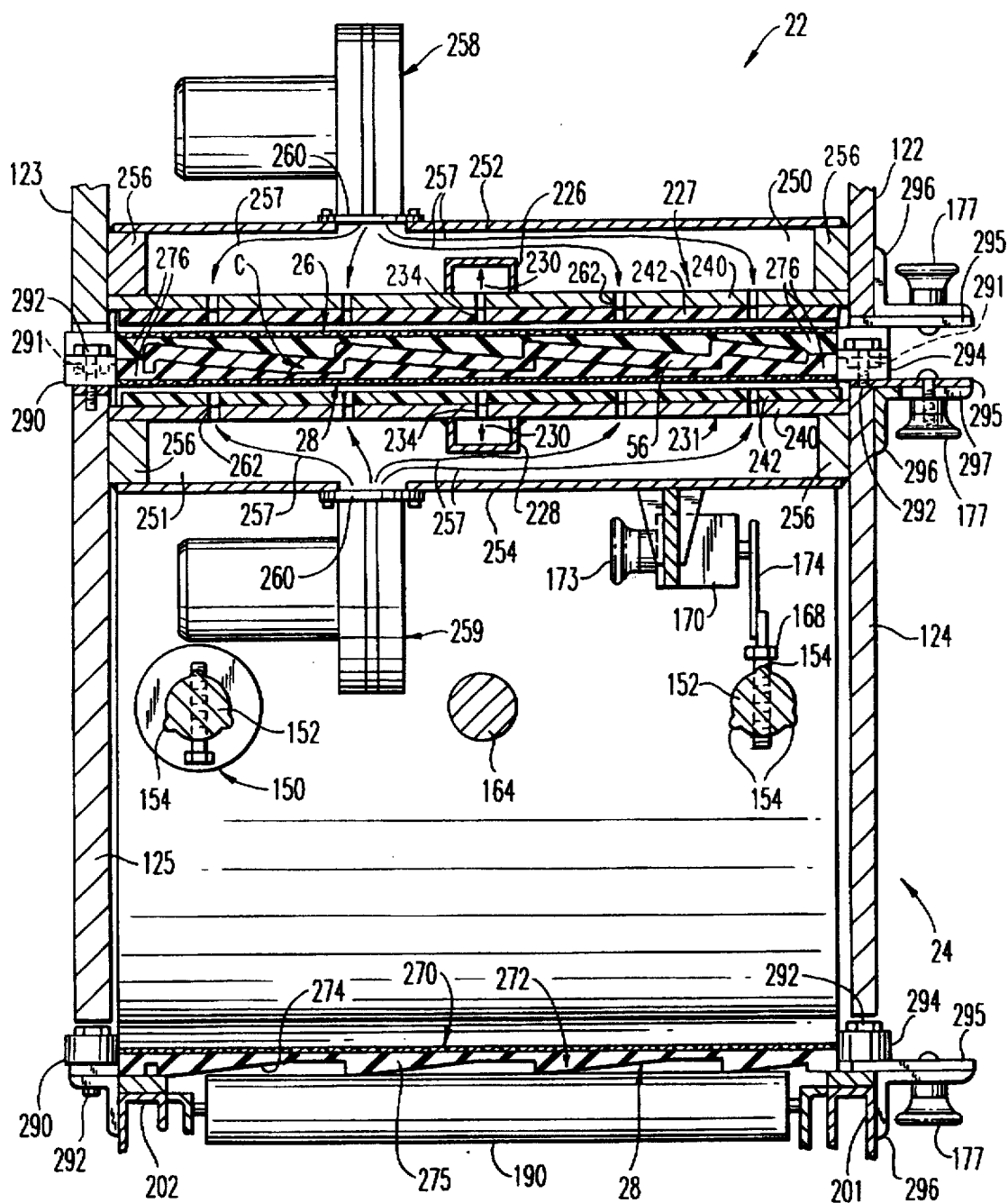
FIG. 7 is an enlarged cross-sectional view of the machine as seen looking along the offset lines 7—7 in FIG. 1.

As seen in FIG. 7, the upper belt carriage 22 includes longitudinally-extending, spaced, parallel front and rear side frame plates 122 and 123, shown partially broken away. FIG. 2 also shows the front and rear side frame plates 122 and 123 for the upper belt carriage 22. Similarly, the lower belt carriage 24 includes longitudinally-extending, spaced, parallel front and rear side frame plates 124 and 125 (FIG. 7). These front and rear frame plates 122, 123 and 124, 125 for the two belt carriages 22 and 24 are also shown in FIG. 3 looking at the entrance 30 of the machine 20.

In FIG. 1 the front side frame plates 122, 124 for the upper and lower belt carriages 22 and 24 are shown having relatively large cut-out openings 126 and 127 respectively. These openings 126 and 127 serve to reduce weight of the belt carriages 22 and 24 and also serve to provide access to the interiors of the respective belt carriages. For example, these openings 126 and 127 may be accessibly closed by hinged door panels 128 each having an openable latch with a handle 129. Alternatively, these openings 126 and 127 may be accessibly covered by name-plate panels removably attached by machine screws. In FIG. 1 the lower hinged door panel 128 is shown opened and swung part way down into a horizontal position. In actual use, such an opened door panel 128 may be allowed to swing completely down resting against its carriage side frame so that it is out of the way for access into an opening 126 or 127. It is noted that the frame plates 123 and 125 at the rear of the respective belt carriages 22 and 24 also may have similar relatively large cut-out openings for reducing weight, for giving access into the belt carriages from the rear while the machine 20 is being assembled, and for passage of electrical conduits, and for servicing screw jacks, blowers, limit switches, etc.

Figure 5A:
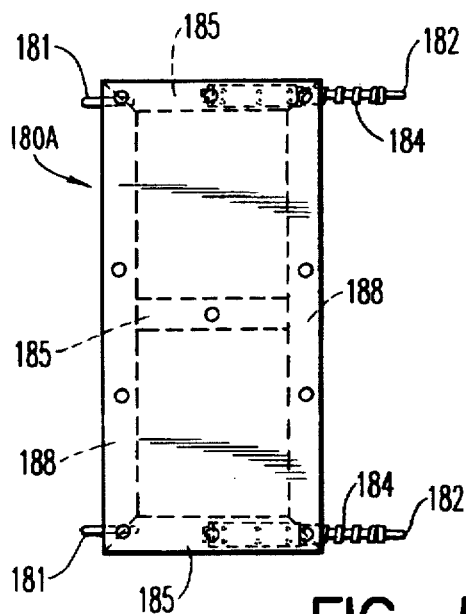
FIG. 5A is a top plan view of an intermediate-length platen bridge which is installed when the exit end of the lower belt carriage is in an intermediate-extension operating position (not shown). A full-length platen bridge is shown in its installed position in FIGS. 5 and 6 in which the lower belt carriage is shown in its fully-extended operating position.
Figure 5B:
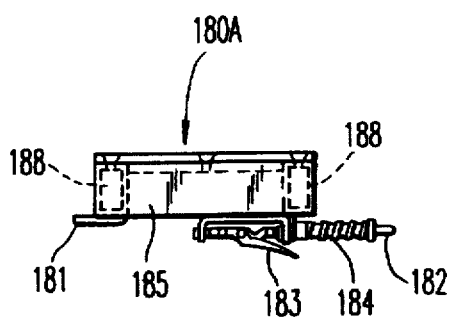
FIG. 5B is a side elevational view of the intermediate-length platen bridge shown in FIG. 5A.
Figure 5:
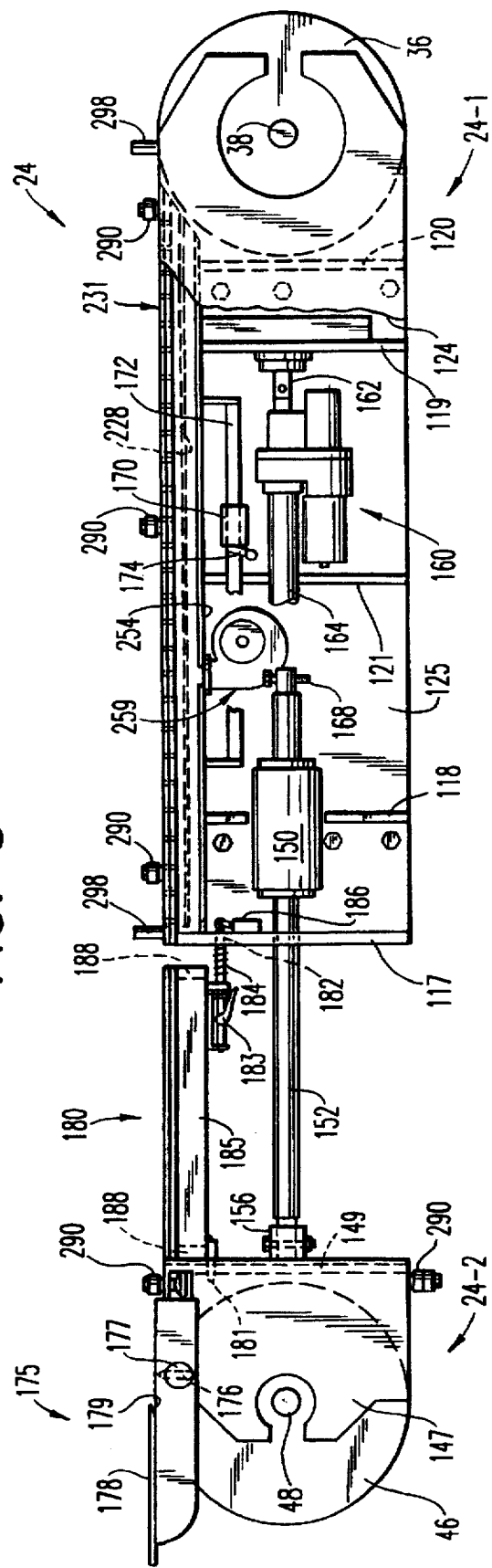
FIG. 5 is a longitudinal elevational view of an extendable-length lower carriage. An extendable exit end of this lower carriage is seen at the left in FIG. 5.
Figure 6:
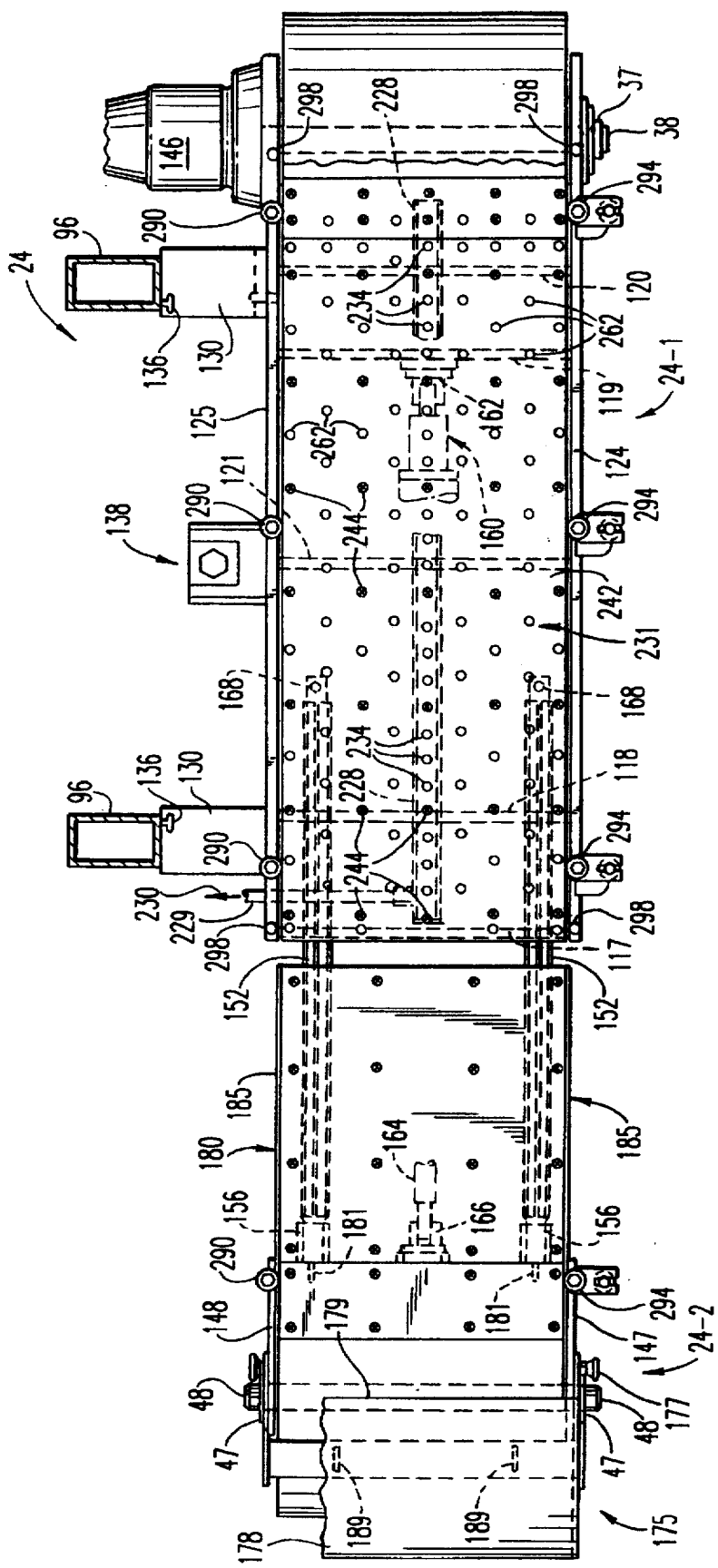
FIG. 6 is a plan view of the lower carriage in a fully-extended operating position as seen looking downwardly along the plane 6—6 in FIG. 1.

Within each belt carriage 22 and 24 there are stiff, transverse braces, for example such as shown in FIGS. 5 and 6 at 117, 118, 119, 120 and 121 for maintaining in parallel alignment the respective side frame plates 122, 123 and 124, 125.

The rear side frame plate 125 of the lower belt carriage 24 is secured in fixed position in the machine by attachment to a pair of upright stanchions 130 (FIGS. 3, 4 and 6) for holding the lower belt carriage in cantilevered relationship projecting forwardly toward the front of the machine (toward the left in FIG. 3 and toward the right in FIG. 4). These two upright stanchions 130 are positioned at the lower ends of the respective two upright frame members 96 and are secured to these upright frame members. Moreover, these two stanchions 130 are secured to the frame 70 for serving the dual functions of supporting the lower belt carriage 24 in its cantilevered position and of bracing and stiffening the two vertical frame members 96 in the manner of footings secured to the frame 70.

The rear frame plate 123 of the upper belt carriage 24 is attached to a twin support chassis 132 which in turn is secured to twin linear-motion bearings 134 which ride up and down with a minimum of friction along two vertical rails 136 affixed to the respective vertical frame members 96. These vertical rails 136 include vertical channels engaged by the linear-motion bearings 134 so that the linear-motion bearings have freedom only to ride up and down along their rails and cannot fall off from the rails.

In order to elevate and lower the upper belt carriage along the vertical rails 136 there is an electric screw jack 138 (FIG. 6) which is mechanically connected between the twin chassis 132 and the frame 70. This screw jack 138 is positioned mid-way between the linear-motion bearings 134 (FIGS. 3 and 4) and provides up and down movement of these linear bearings riding vertically along their parallel vertical rails 136 with a minimum of friction. This screw jack 138 raises and lowers the upper belt carriage 22 relative to the lower belt carriage 24 while maintaining the upper carriage horizontally aligned with and directly positioned above the lower carriage. The upper carriage is raised for servicing the machine and also for enabling the upper and lower mold belts 26 and 28 to be changed. The upper carriage is lowered for bringing the revolvable mold belts together in face-to-face relationship for defining one or more travelling mold channels C between the two mold belts. A limit switch 137 (FIG. 1) connected in a control circuit with the electric screw jack 138 serves to limit upward travel of the upper carriage. Electric screw jack 138 normally lowers the upper carriage at a rate of about 12 inches per minute to provide the operator with precise control over positioning of the upper carriage relative to the lower carriage for precisely controlling closure of the two mold belts along the travelling mold channel C. This screw jack has a second considerably higher lift speed of about twenty-three inches per minute (approximately twice the down rate) when any one of a plurality of emergency switches 139 is actuated. These emergency switches 139 may be mounted at any suitable location and may include foot switch 139 (FIG. 3) if desired. Actuation of any emergency switch 139 immediately causes rapid lifting of the upper carriage and immediately shuts off power to both belt drive systems 140 and 144 (FIGS. 2 and 3).

DRIVE SYSTEM FOR SYNCHRONIZING THE UPPER AND LOWER REVOLVING MOLD BELTS

For revolving the upper mold belt 26 in its oval path around the upper belt carriage 22, there is shown a controllable-speed electric motor drive system 140 (FIGS. 2 and 3) comprising a controllable-speed motor 141 driving a speed-reducing transmission 142 having its output connected to the shaft 34 of the upper nip pulley roll 32 (FIG. 1) for rotationally driving this upper nip pulley roll. For example, the motor 141 may be a brushless-type controllable-speed DC motor of at least 3 HorsePower. Such a motor has a permanent magnet rotor and a stator winding like an induction motor with a built-in digital position and speed sensor for sensing the angular position and rotational speed of the rotor. For example, a suitable motor of this type rated at 3 HorsePower with its electronic controller is commercially available from Powertec Industrial Corporation located at 3958 Airway Drive, Rock Hill, S.C. 29732 designated a Brushless DC Drive System.

For revolving the lower mold belt 28 in its oval path around the lower belt carriage 24, another controllable-speed electric motor drive system 144 (FIG. 3) is employed. This second drive system 144 comprises a controllable-speed motor 145 driving a speed-reducing transmission 146 having its output connected to the shaft 38 of the lower nip pulley roll 36 (FIG. 1) for rotationally driving this lower nip pulley roll. For example, the motor 145 with its electronic controller may be identical with the motor 141.

To maintain the upper and lower belts 26 and 28 revolving in synchronism for keeping in registration upper and lower mold patterns, it is preferred that effective thicknesses of the two mold belts be made the same and circumferential lengths of their respective mold surfaces be made the same. The two controllable-speed electric drive systems 140, 144 may be synchronized as to speed of their respective drive motors 141, 145 or may be controlled in accord with torque load being experienced in rotating the respective nip drive pulley rolls 32 and 36 as they are revolving the two belt molds in direct contact with each other as they 3-D form the molded profiles on 3-D products P. As described previously the upper and lower nip pulley rolls 32 and 36 and also the upper and lower exit pulley rolls 42 and 46 are covered with a rubber fiber layer 60. The thickness of these rubber layers 60 is in a range from about ⅜ of an inch to about ⅝ of an inch, for example preferably being about ½ inch thick. This rubber fiber coating 60 has a durometer rating between about 70 and about 90, for example preferably being about 80. By virtue of having this rubber coating on the drive (nip) pulley rolls 32 and 36, essentially no slippage occurs between these drive pulley rolls and the multi-ply-plastic-backed revolving mold belts. Thus, there is no need for sprocket-like engagement of the drive pulley roll with the revolving mold belt, because essentially no slippage is occurring, due to the rubber drive layer 60 engaging a multi-ply plastic belt backing layer of the mold belt. The four pulley rolls 32, 36, 42 and 46 as shown have a diameter of about eighteen inches including the radial thickness of their rubber fiber coating 60.

EXTENDABLE AND RETRACTABLE EXIT ENDS OF BELT CARRIAGES

In FIGS. 5 and 6, the lower belt carriage 24 is shown equipped with an extendable and retractable exit end 24-2. This exit end 24-2 includes front and rear side frame plates 147 and 148 with a transverse brace 149 (FIG. 5) interconnecting them. For supporting this exit end 24-2, there are a pair of linear motion bearings 150 (only one is seen in FIG. 5). These bearings 150 are secured in fixed positions in spaced, parallel relationship within the entrance end structure 24-1 of the lower carriage 24, and they have a pair of support rods 152 longitudinally movable through them. In FIG. 7, each of these support rods 152 is shown enlarged in section including three longitudinal ridges 154 for preventing the rod from turning relative to its bearing 150. In FIGS. 5 and 6, the outer ends of these support rods 152 are shown attached at 156 to the transverse brace 149 (FIG. 5) for supporting the exit end 24-2 in alignment with the entrance end 24-1 of the lower belt carriage 24. In FIG. 1 these extendable and retractable support rods are shown each enclosed within a protective, accordian-like, pleated sleeve 93.

In order to extend and retract the exit end 24-2 relative to the entrance end 24-1 of the lower belt carriage, an electric screw jack 160 (FIGS. 1 and 5) is shown connected by a linkage 162 to the transverse brace 119 (FIG. 5) between the side frames 124, 125. This jack 160 has a telescoping feedscrew 164 whose distal end is connected by a clevis 166 (FIG. 6) to the transverse brace 149. Thus, the jack 160 can be energized for extending or retracting the exit end 24-2 relative to the entrance end 24-1 of the lower belt carriage 24.

For preventing the support rods 152 from being completely withdrawn from their bearings 150, the inner ends of each of these rods has a keeper machine screw 168 (FIGS. 1 and 5) threaded through a tapped hole forming a stop.

In order to limit and adjust the retraction stroke of the electric screw jack 160, a limit switch 170 (FIGS. 1, 5 and 7) is shown adjustable in position along a guide rod 172. A handle clamp 173 (FIG. 7) holds this limit switch in its adjusted position on the guide rod. As shown in FIG. 7, this limit switch 170 has its switch arm 174 aligned with the head of one of the keeper screws 168. When this switch arm 174 is moved by contact with the keeper screw 168, a retraction stroke of the electric screw jack 160 is shut off.

The exit end 22-2 of the upper belt carriage 22 is mounted, supported and moved relative to the entrance end 22-1 by mechanisms which are identical with those already described for the exit end 24-2 of the lower belt carriage 24; thus, there is no need to show nor describe such mechanisms in detail for the upper exit end 22-2.

As illustrated in FIGS. 12 and 13, the machine 20 of FIG. 1 is shown equipped with a lower exit pulley roll stabilizer for providing more precise alignment of the exit pulley roll 46 with the front end structure 24-1 of the lower belt carriage 24. This lower exit pulley roll stabilizer seen in FIGS. 12 and 13 will be described later.

In FIGS. 5 and 6, a removable platen bridge 180 is shown inserted between the extendable exit end 24-2 and the elongated entrance end structure 24-1 of the lower belt carriage 24. This platen bridge 180 is shown including a pair of pins 181 (only one is seen in FIG. 5) removably insertable into socket holes in the transverse brace 149. For holding this platen bridge 180 in its installed position, there are shown a pair of toggle-actuated retractable pins 182 (only one is seen in FIG. 5) which are removably inserted into socket holes in the transverse brace 117 of the carriage entrance structure 24-1. A toggle-handle 183 is manually operated for extending or retracting the pins 182. Also, a compression spring 184 mounted on the shank of each pin 182 abuts against the transverse brace 117. This spring 184 becomes compressed moderately when the bridge 180 is installed for pushing the bridge firmly in place against the exit end 24-2 while also seating the pins 181 firmly into their socket holes in the exit end. The platen bridge 180 is shown with longitudinal frame elements 185 (FIGS. 5 and 6) and transverse frame elements 188.

An interlock switch 186 may be used for preventing machine operation with exit end 24-2 in extended position, unless a platen bridge is installed. An inserted pin 182 of the bridge actuates this interlock switch 186 for signalling that a bridge is in place. Also, actuation of this interlock switch prevents further retraction of the exit end with a bridge in place for preventing inadvertent compression damage of a bridge.

For accommodating various sizes of mold belts, various lengths of removable bridges may be installed by the operator of the machine 20. For example, the operator may be running mold belts 26 and 28 each having circumferential length of twenty feet. For these longer length belts, the operator may install the longer platen bridge 180 as shown.

As another example, the operator may want to run the machine 20 with mold belts 26 and 28 each having an intermediate circumferential length of eighteen feet. For accommodating such intermediate-length mold belts, the bridge 180 is removed and an intermediate-length platen bridge 180A (FIGS. 5A and 5B) is installed. This intermediate bridge 180A is shown having longitudinal and transverse frame elements 185 and 188, respectively.

For running smaller mold belts, for example each having a circumferential length of sixteen feet, neither of the platen bridges 180 nor 180A is used, because the carriage exit end 24-2 is retracted into a fully-retracted position which is close to the carriage entrance end structure 24-1. No bridge is needed, since the gap between fully-retracted carriage exit end 24-2 and carriage entrance end 24-1 is small and readily traversed by a revolving mold belt without a bridge.

For accommodating circumferential mold belt lengths of 16 and 18 feet or of 18 and 20 feet, i.e., wherein there is a difference of two feet, the exit ends 22-2 and 24-2 are extendable and retractable over a span of at least thirteen inches. Twelve inches produces a two-foot difference in the oval path length around each carriage. At least thirteen inches of extension/retraction provides one-inch of clearance slack for installation and removal of belt molds. For accommodating mold belt lengths of 16, 18 and 20 feet, the exit ends 22-2 and 24-2 are extendable and retractable over a span of at least twenty-five inches. Twenty-four inches of extension/retraction provides a four-foot difference in the oval path length, and an additional extension/retraction of at least one inch provides one-inch of clearance for installation and removal of belt molds.

For supporting the product P issuing from the exit 40, an adjustable, removable, product-support shelf assembly 175 is shown in FIGS. 1, 5 and 6. For mounting this shelf assembly 175 onto the lower exit end 24-2, side frame elements of this assembly each include a vertical slot 176 releasably engaged by handle clamps 177 connected with the front and rear side plates 147, 148 (FIG. 6) of the exit end 24-2. Included in the shelf assembly 175 is a horizontal tray plate 178 having an undercut chamfered leading edge 179 (FIG. 5) for roll clearance. This leading edge can be adjusted into a position near the crown of the lower exit pulley roll 46 for providing immediate support as shown in FIG. 1 for emerging product or products P. For adjustment of the position of its leading edge 179, the tray plate 178 is movably mounted on a transverse frame element having two parallel elongated slots 189 (FIG. 6) adjustably engaged from underneath by manually-operable handle clamps (not seen).

RETURN-TRAVEL-SUPPORT ROLLERS FOR MOLD BELTS

For supporting the return-travel 52 (FIG. 1) of the revolving upper mold belt 26, free-rotating return-travel-support rollers 190 (FIG. 2) are arranged in spaced, parallel alignment between the upper margins of the front and rear side frames 122, 123 of the upper belt carriage 22. For bridging the gap between the fully-extended exit end 22-2 and the entrance end 22-1 of the upper carriage, a removable bridge 180B (also seen in FIGS. 2B and 2C) is shown including six of these rollers 190. These bridge rollers become aligned with the other return-travel-support rollers 190 in the front end 22-1 when this bridge 180B is installed in operating position as shown in FIGS. 1 and 2.

It will be understood that a removable intermediate-length roller bridge (not shown) is provided for the upper belt carriage 22 when the upper carriage is to be operated in an intermediate-extension position. This intermediate-length roller bridge is similar to the intermediate-length bridge 180A shown in FIGS. 5A and 5B, except that the intermediate-length bridge for the upper carriage is a roller bridge, whereas the intermediate-length bridge 180A in FIGS. 5A and 5B is a platen bridge. As an example, such an intermediate-length roller bridge may include two or three of the rollers 190.

For supporting the return-travel 54 of the revolving lower belt 28, a pull-out, drawer-like assembly 200 (FIGS. 8 and 9) is provided as described below in the next section.

PULL-OUT DRAWER ASSEMBLY INCLUDING RETURN-TRAVEL-SUPPORT ROLLERS FOR LOWER MOLD BELT

In FIGS. 8 and 9 is shown a pull-out, drawer assembly 200 including multiple freely-rotatable rollers 190. This drawer assembly 200 as shown includes longitudinal front and rear side frames 201 and 202 with the rollers 190 between them. Transverse frame elements 204 and 205 join the side frames, and a pair of handles 206 are mounted on the front side frame 201 for manually pulling the drawer 200 out or pushing it in. This drawer assembly 200 includes two spaced parallel angle irons 208 extending rearwardly. Parallel rails 210 are secured to the inner faces of these two angle irons. Thus, the rails 210 project inwardly toward each other, as is seen in FIG. 1. These rails are shown with accordion-pleated covers 95. A mounting rig 212 for each cover 95 allows its associated cover to extend on one side of this rig and to contract on the other side as the drawer assembly 200 is pulled out or pushed in. The rails 210 ride along linear-motion bearings 214 (FIG. 1) mounted on the frame 70 so that this drawer assembly 200 can be pulled out and pushed in with a minimum of friction. During operation of the machine 20 for 3-D forming of products from heated thermoplastic material 56, the drawer 200 is fully pushed in to its normal operating position directly below the lower belt carriage as is shown in FIGS. 1 and 2 for supporting return travel 54 (FIG. 1) of the revolving lower belt 28. It is noted that the drawer 200 has a cantilevered end component 216 extending toward the left in FIG. 1, toward the exit, for providing a relatively large overall area of support for the lower mold belt during its return travel 54.

REMOVAL OR INSTALLATION OF MOLD BELTS, WITH USE OF THE PULL-OUT DRAWER

For removal of the mold belts the upper belt carriage 22 is raised for separating the upper and lower mold belts from each other. The exit end 24-2 of the lower carriage is retracted, thereby slacking the lower mold belt 28, and the portion of the lower mold belt below the lower carriage now rests down onto the pull-out drawer 200. Thus, this drawer 200 now is supporting the weight of much of the lower portion of this lower mold belt. As the lower mold belt is slid off from the front side of the lower carriage, the drawer 200 is pulled out for aiding in the removal.

After the lower mold belt has been removed, the exit end 22-2 of the upper carriage is retracted for slacking the upper mold belt. Then, the slackened upper mold belt is slid off from the front side of the upper carriage.

The reverse procedure is used for installing the two mold belts. First, the upper mold belt is slid onto the upper carriage with the upper carriage in its raised position and with its exit end 22-2 retracted. After the slack upper mold belt has been slid into position, the upper exit end is extended sufficiently for snugging the upper belt around the upper carriage.

The upper carriage is held in its raised position during installation of the lower mold belt, and the exit end 24-2 of the lower carriage is retracted. The drawer 200 initially is pulled out for aiding in supporting the lower mold belt. Then, as the lower mold belt is slid onto the lower carriage, the drawer 200 is pushed in. Finally, the exit end 24-2 of the lower carriage is extended for snugging the lower belt around its carriage.

VACUUM SYSTEM FOR HOLDING CENTERLINE OF A TRAVELLING MOLD BELT AGAINST THE SLIPPERY SURFACE OF ITS PLATEN

To hold the centerline of a travelling mold belt against the slippery surface of its platen, a vacuum system 220 is shown in FIGS. 2 and 4. This vacuum system includes an oiless, positive-displacement, revolving-vane-type vacuum pump 221 driven by an electric motor 223 mounted on a bracket 224 fastened to the upright frame member 96 closer to the exit end of the machine. This vacuum pump 221 is shown connected through a first suction line 225 to a first vacuum (or suction) channel 226 (FIG. 7) extending longitudinally along the centerline of an upper guide platen 227 for guiding the revolving upper mold belt 26. Also, the vacuum pump is shown connected through a second suction line 229 to a second vacuum (or suction) channel 228 (FIG. 7) extending longitudinal along the centerline of a lower guide platen 231 for guiding the revolving lower mold belt 28. As mentioned previously, this lower vacuum channel 228 may be omitted by relying on weight of the lower mold belt to hold itself down. This lower vacuum channel may be provided in case a machine operator wishes to use it. This lower vacuum channel is shown in dashed outline in FIGS. 5 and 6 extending for substantially the entire length of the lower guide platen 231, which in turn extends from nearby the crest of the lower nip pulley roll 36 along the top of the entrance end 24-1 of the lower carriage.

Suction flow arrows 230 in FIGS. 4, 6 and 7 indicate action of the vacuum pump 221 in drawing a vacuum in the respective upper and lower vacuum channels 226 and 228. As an example, a suitable vacuum pump 231 is driven by a 1½ HorsePower motor 223 and has a continuous-duty vacuum capability of 27 inches of a Mercury column, and when used as a compressor has a continuous-duty pressure output of 10 pounds per square inch (p.s.i.). With free-air input, the pumping capacity over an output pressure range of zero to 10 p.s.i. is 21 to 17.9 cubic feet per minute (CFM).

In order to protect the vacuum pump 231 from contamination by dust, grit or moisture, a pair of filter and moisture traps 232 (FIGS. 2 and 4 are shown positioned near the vacuum pump. These traps 232 are connected into the respective suction lines 225 and 229. These traps include removable transparent jars, so that the machine operator can see when the jars are filling with water and need to be emptied and can see when the filters are becoming dirty and need to be cleaned or replaced.

It is to be understood that the upper vacuum channel 226 is the same length as the lower channel 228. The upper vacuum channel 226 extends for substantially the entire length of the upper guide platen 227, which in turn extends from nearby the lowest region of the upper nip pulley roll 32 along the bottom of the entrance end 22-1 of the upper carriage.

In FIG. 7 the upper and lower revolving mold belts 26 and 28 are shown vertically spaced slightly away from their respective upper and lower guide platens 227 and 231. This vertical spacing is for clarity of illustration. In actual operation, these two revolving mold belts 26, 28 are sliding along adjacent to their respective guide platens 227, 231. The respective vacuum channels 226, 228 communicate through suction ports 234 (FIG. 7) extending through the respective platens. These suction ports 234 enable the suction action to communicate with the back (inside surface) of the respective revolving mold belt for drawing (suction pulling and holding) the back of the respective mold belt adjacent to the slippery surface of its guide platen. As an example, FIG. 6 shows nineteen of such suction ports 234 arranged in a line spaced along the length of the lower vacuum channel along the centerline of the platen 231 in the entrance end 24-1 of the lower carriage. There is a similar arrangement of a similar number of suction ports in the centerline of the platen 227 in the entrance end 22-1 of the upper carriage. Thus, the revolving mold belts are being continually drawn toward their platens and are prevented from bulging away from their platens.

Moreover, in actual operation, a cooling and lubricating air film is provided between the back (inside surface) of the revolving mold belt adjacent to the slippery surface of its respective guide platen for providing lubricating action and for cooling to remove heat generated by friction in the interface between a moving mold belt and its adjacent platen. The provision of this cooling and lubricating air film is described below in the next section. There is an advantageous dynamic balance between the cooling and lubricating air film which would tend to push a revolving belt away from its guide platen and the suction action 230 being applied through centerline ports 234 which is drawing the centerline of each revolving mold belt toward its guide platen.

SLIPPERY GUIDE PLATEN STRUCTURE WITH AIR-FILM LUBRICATION AND COOLING

The upper and lower guide platens 227, 231 (FIG. 7) each include a rigid metal plate 240 which is shown covered on its surface toward the respective mold belt by a slippery sheet 242 of PTFE (Teflon) having 25% glass-fiber reinforcement embedded therein for wear resistance. As an example, this slippery plastic covering sheet 242 may have a thickness in a range from about 5/16ths of an inch to about 7/16ths of an inch and preferably may have a thickness of about ⅜ths of an inch. In FIG. 6 the slippery plastic sheet covering 242 for the lower guide platen 231 is shown secured to the underlying rigid metal plate 240 by a plurality of rows of countersunk, flat-headed machine screws 244. The upper slippery sheet 242 is secured similarly to its overlying rigid metal plate 240 by similar machine screws (not seen). As an example, this glass-fiber-reinforced PTFE may have a strength rating of about grade 5 on a scale of 2 to 8, in which 8 is the strongest. In other words, the slippery sheets 242 may be about mid-way in the strength grading scale for optimum performance. Strength is increased by increasing glass-fiber reinforcement content, but above about mid-way of the strength scale it appears that the desired slippery surface characteristics of a covering sheet 242 may be adversely affected by an unduly large percentage of glass fiber content.

For providing air-film lubrication and cooling of the slippery surfaces of platen sheets 242 adjacent to the back (inside) surfaces of the respective revolving mold belts, respective upper and lower plenum chambers 250 and 251 extend for substantially the entire length of the entrance ends 22-1 and 24-1 of the respective upper and lower carriages. These plenum chambers are shown in FIG. 7 constructed by respective upper and lower horizontal plates 252 and 254 spanning across between the respective front and rear side frame plates 122, 123 and 124, 125 of the upper and lower carriages 22 and 24. These horizontal plates 252 and 254 are shown welded to braces 256 extending horizontally along the side frame plates of the carriages.

In order to pressurize the interiors of the respective plenums 250 and 251, as is indicated by air flow arrows 257 (FIG. 7), identical upper and lower electric-motor-driven centrifugal blowers 258 and 259 are mounted onto the upper and lower plenum chamber plates 252 and 254 with their outlets 260 aimed through blower ports in the respective plates 252, 254 creating air flow 257 for pressurizing the interiors of the respective plenums 250, 251.

To feed air through the respective platens into the interface between the revolving mold belt and the slippery surface of its adjacent guide platen a multiplicity of small apertures 262 (FIG. 7) are shown communicating with the interiors of the plenums 250, 251 and passing completely through each of these platens, i.e., passing through the rigid metal plates 240 and also through their slippery plastic sheet coverings 242. Each such interface is between a multi-ply-plastic backing (to be described later) of a revolving mold belt and the slippery covering on its guide platen. As an example, these apertures 262 may be about ⅛ths of an inch in diameter, and as shown in FIG. 6 there are more than 70 of these apertures 262 in the lower platen 231. These lubricating and cooling apertures 262 are in addition to the suction ports 234 communicating with each vacuum channel.

For providing an advantageous dynamic balance between the suction 230 which is holding the centerline of at least the upper travelling mold belt against the slippery platen surface and the pressurization 257 of the plenums, the blowers 259 as shown are each rated at ⅒ HorsePower and a speed of 2,870 RPM for free-air delivery of 100 CFM. Over a pressure range of one to five inches of water column their capacity is 98 to 80 CFM. The vacuum pump 221 and its electric motor 223 have already been described.

MOLD-BELT STRUCTURE

Figure 10:
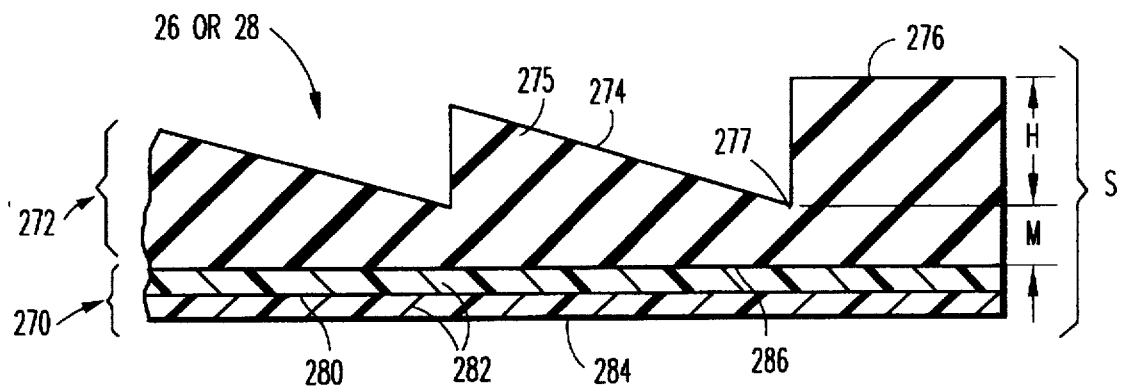
FIG. 10 is an enlarged cross section of a portion of a flexible mold which is laminated to an essentially non-stretchable multi-ply plastic backing belt. This flexible mold itself (considered apart from its backing belt) is a silicone rubber mold having a patterned 3-D mold surface and the silicone rubber mold is seamed along a diagonal that is at least as long as one-half of the circumference of the nip rolls.
Figure 11:
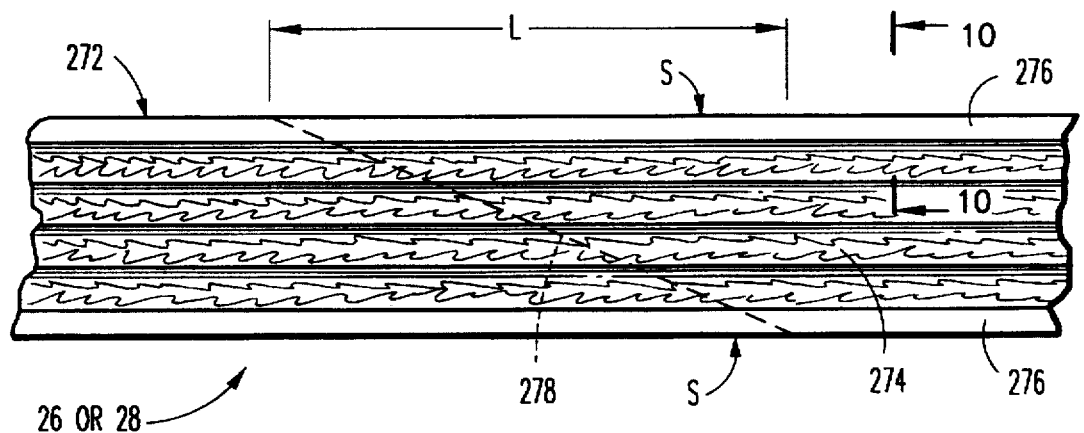
FIG. 11 is a partial plan view of smaller size than FIG. 10.

With reference to FIGS. 10 and 11, a mold belt 26 or 28 is shown including an essentially non-stretchable multi-ply plastic fiber and plastic resin backing belt 270, for example a five-ply seamless belt. A silicone rubber mold 272 is bonded to this backing belt and has a patterned 3-D mold surface 274. The silicone rubber itself is indicated by reference number 275. The mold surface 274 includes a shoulder 276 extending along each margin of each mold belt. These belt shoulders 276 mate (FIG. 7) with opposing shoulders of the other mold belt for defining one or more travelling mold channels C. FIG. 7 shows a travelling mold channel C filled with heated thermoplastic material 56 which has been 3-D formed in the nip region for completely filling the travelling mold channel and which is now being cooled by the travelling belts 26 and 28 for forming products P (FIG. 1). The localized, progressive-rolling, squeezing action which occurs in the nip region thoroughly and accurately distributes the thermoplastic material 56 into intimate contact with the entire patterned 3-D mold surfaces 274 of both mold belts, thereby causing this material to completely fill the travelling mold channel or channels C for providing products P having high-quality, high-fidelity, fine-detailed reproduction of the mold surfaces 274. The operator controls the electric screw jack 138 for controlling the mating pressure between the opposed contacting shoulders 276 of the two revolving mold belts for avoiding "flash" (inadvertent extrusion or leakage of heated thermoplastic material 56) between these contacting shoulders.

As shown in FIG. 11, this flexible mold 272 itself is seamed along an essentially imperceptible diagonal seam 278 having a circumferential length L at least equal to one-half of the circumference of the nip pulley rolls 32 and 36. For example, with a nip pulley roll diameter of 18 inches, the length L is at least 28¼ inches. This elongated diagonal arrangement of the seam 278 is presently preferred for distributing stress on the seam as the mold belt 26 or 28 runs around the nip pulley roll and enters the nip region with the heated thermoplastic material 56 being introduced between the mold belts.

It is presently preferred that the silicone rubber 272 after curing for two days provide a durometer rating of at least about 55 and preferably about 60. Then, after curing for at least two months, this silicone rubber provides a durometer rating of at least about 65 and preferably about 70.

The illustrative backing belt 270 has a thickness between 0.100 and 0.125 of an inch, for example being about 0.110 of an inch thick and comprises a central essentially non-stretchable woven plastic fabric layer 280, which is woven of a non-elastic plastic fiber, for example an aromatic polyamide fiber of extremely high tensile strength and greater resistance against elongation than steel, for example such as is commercially available from E. I. duPont de Nemours & Company under the trademark "KEVLAR". Adjacent to this central essentially non-stretchable plastic fabric central ply 280 are two plies 282 of non-woven plastic film resin. Thus, the non-stretchable woven plastic fabric layer 280 is shown sandwiched between two non-woven plastic resin film layers. For example, the plastic resin in layers 282 is a suitable adherent laminating plastic resin material such as polyester resin. Then, on the inside surface of the belt 270 is a woven plastic fabric layer 284, for example woven of polyester fiber. Similarly, on the surface of the belt 270 for bonding to the flexible silicone rubber mold 272 is another woven plastic fabric layer 286, for example woven of polyester fiber. It is preferred that the surface of this layer 286 be roughened by sandpaper before the silicone rubber mold is bonded to it. The rubber mold 272 together with its multi-ply, non-stretchable plastic fiber and plastic resin backing belt 270 are both shaped to provide square edge shoulder surfaces "S" each of which extends perpendicular to the plane of the inside plastic fabric layer 284. The overall height S (or overall thickness) of the mold belt 26 or 28 is determined as the sum of three factors: (i) the thickness of the backing belt 270 plus (ii) a minimum thickness "M" of silicone rubber 275 between a lowest point 277 of a 3-D patterned surface and the adjacent fabric ply 286 of the backing belt 270 plus (iii) the height "H" of a pattern in the mold belt. The minimum rubber thickness dimension M is at least ¼ of an inch. The height H may be as small for example as 0.1 inch and may be as large for example as up to 2 inches, depending on the product P being 3-D formed. The width of a mold belt 26 or 28 is about three inches more than the overall width occupied by the travelling mold channel or channels C. For example, with an overall mold channel width of 24 inches, the overall width of the mold belts is 27 inches. The travelling mold channel C is at an elevation of 42 inches above the floor 76 (FIG. 1) for aligning with a usual elevation of an extruder outlet orifice.

REVOLVING MOLD BELT EDGE-GUIDE ROLLER SYSTEM

By making the mold belts 26 and 28 with square edge shoulder surfaces S extending for a full depth of the edge of the backing belt 270 plus the full depth of the shoulder 276 along the margin of the rubber mold 272, an edge-guide roller system can be used to advantage as now will be described. At spaced intervals along the rear edge of the oval path travelled by the respective revolving mold belt 26 or 28 mounted on the rear side of each belt carriage 22 and 24 are edge-guide rollers 290 (FIGS. 2, 2A, 3, 4, 5, 6 and 7) which are fixed in their respective locations. As shown in FIG. 7, an edge-guide roller 290 includes a bearing 291 and is mounted by a machine screw axle 292 to a rear side frame member of the belt carriage. FIGS. 8 and 9 show two edge-guide rollers 290 (see also FIG. 7) mounted on the rear side frame 202 of the pull-out drawer 200. There may be more than two such rollers on the roller drawer 200, depending on its length. As seen in FIG. 7, edge-guide rollers are intended to contact and to roll along substantially the full height of the square edge surface S (FIG. 10) so that each roller is engaging the edge of the backing belt 270 plus the edge of the rubber mold 272, particularly so along the edge of the travelling mold channel C. Four edge-guide rollers 290 are shown in FIGS. 2, 5 and 6 mounted along the rear edge of the travelling mold channel C and four more are provided along the return travel path, including two rollers 290 (FIG. 8) on the rear of pull-out drawer 200. In other words, there are shown a total of eight rear edge guide rollers on each belt carriage, i.e., sixteen total rear guide rollers.

At spaced intervals on the front side of each belt carriage 22 and 24 along the front edge of the oval path travelled by each revolving mold belt are provided edge-guide rollers 294 which are adjustable in position. As seen most clearly in FIG. 7 each adjustable roller 294 includes a bearing 291 and a machine screw axle 292 mounted to a small plate 295 which is adjustable in position on an L-shaped bracket 296 secured to a front side frame member of the belt carriage. The bracket 296 has an open-ended slot 297 used with a handle clamp 177 for holding the small plate 295 in its adjusted position on the bracket 296. The open ending of slots 297 allows easy removal of the front edge-guide rollers 294 when it is desired to remove a mold belt from around its carriage.

An adjustable roller 294 is located along the front of each carriage opposite each of the rear rollers 290, as shown in FIG. 6. For example as shown in FIGS. 1 and 1A there are eight of the adjustable front rollers 294 on each belt carriage. Edge-guide rollers on the bottom of the upper carriage and on the top of the lower carriage are shown offset slightly (as seen in FIGS. 1 and 1A) in longitudinal position along the edge of the travelling mold channel for avoiding interference between upper and lower edge-guide rollers when the upper carriage is lowered into operating position near the lower carriage.

INTERCHANGEABLE VERTICAL-SPACER-PIN-SYSTEM

If desired, interchangeable vertical spacer pins 298 (FIGS. 1, 1A, 5 and 6) may be removably inserted into sockets on the top edges of the front and rear side frame members 124, 125 of the lower belt carriage. These spacer pins 298 are contacted by the lower edges of the front and rear side frames 122, 123 of the upper carriage when it is lowered for preventing further downward movement of the upper carriage for limiting the amount of closure pressure of the mating belt shoulders 276 of the upper and lower belts. The vertical height of such interchangeable spacer pins 298 may be coordinated with the overall combined shoulder height S (FIG. 10) of two mating belts. In other words, when using mold belts having a smaller total of their "S" dimensions, then spacer pins with a corresponding lesser height are used, and vice versa. Thus, such spacer pins 298 may be used for predetermining vertical pressure between mating mold belt shoulders 276 along the travelling mold channel or channels C to be sufficient for preventing outward "flash" of thermoplastic 56 between them, while also limiting and thereby avoiding undue vertical pressure on the revolving mold belts which might unduly squash and deform the mating mold belt rubber shoulders 276 as they are travelling along the moving mold channel or channels C.

EXIT PULLEY ROLL STABILIZER

An exit pulley roll stabilizer 300 (FIGS. 12 and 13) is shown for stabilizing the position of the lower exit pulley roll 46 by stabilizing the vertical location of the lower exit end 24-2 relative to the entrance end 24-1 of the lower carriage. This stabilizer 300 includes a track plate 302 welded to a mounting block 304 which in turn is welded to the front side frame 124 of the entrance end 24-1. The upper edge of this track plate 302 provides a horizontal longitudinally-extending rail 306. A track-follower roller 308 continually seats down on this rail 306 and rides along the rail as the exit end 24-2 is extended and retracted. The axle 310 of this roller 308 is secured in a plate 312 welded to a mounting block 314 which in turn is welded to the front side frame plate 147 of the exit end 24-2. A stop 316 prevents the roller 308 from rolling off of the rail 306 at a farthest extension of the exit end, as is shown in FIGS. 12 and 13.

OPERATING CONTROLS AND TEMPERATURE CONTROL OF REVOLVING MOLD BELTS

Operating controls with an attractive control panel 320 (FIGS. 1A and 2A) are provided in a housing 322 supported by hollow square beams 324 from the upper ends of the upright frame members 96. The control panel 320 is shown inclined for facing downwardly in FIGS. 3 and 4 for convenience of the operator in viewing readouts and signal lamps and for convenience in reaching up to actuate various control switches and keypads. The keypads, readouts, signal lamps and control switches may be positioned in any suitable location on the panel 320 which is formed of stainless steel with suitable openings and holes for mounting of components. It is to be understood that operation of machine 20 may be made as automatic as may be desired. Temperatures of the revolving mold belts 26 and 28 are sensed by upper and lower infra-red sensors 326, 328 (FIGS. 1 and 3) whose respective sensor beams are shown by dash-dot lines 327, 329. These sensor beams 327, 329 are adjustable in scope for sensing average temperatures extending across various spans in width of a revolving belt or for sensing temperatures in a focused spot as the revolving belt passes through this spot. Also, the sensors 326, 328 are laterally adjustable along respective upper and lower mounting tracks 330, 331 (FIG. 3) for focusing on particular regions of a revolving belt.

By entering desired operating temperatures for the upper and lower belts by using keypads 332, 333 (FIG. 1A), and by entering desired belt speeds or drive torques via keypads 334 and 336, operation of machine 20 may be programmed to be automatic as soon as belt pre-heating has brought the temperatures of their 3-D patterned mold surfaces 274 into a desired operating range.

This optimum range of operating temperatures of the patterned mold surfaces depends upon characteristics of the particular plastic materials being 3-D formed. Usually this optimum temperature range of the patterned mold surfaces is at least 25° F. above room temperature to produce a product with the best physical and aesthetic properties. Thus, prior to running a continuous 3-D forming operation on heated thermoplastic material, the molding surfaces of the two mold belts are not cooled. Instead, both mold surfaces are warmed up (pre-heated) into a desired predetermined temperature range by revolving both belts at their predetermined operating speed and by blowing heated air onto their mold surfaces as they revolve. The preheating of the mold surfaces shortens the start-up time, improves product quality, and reduces scrap. After the mold surfaces have been pre-heated, thermoplastic material at its predetermined operating temperature may be fed into the travelling mold channel for a brief start-up time until the temperature of the moving mold surfaces is stabilized within a controlled optimum temperature range as will be explained later. During this brief start-up time, 3-D formed product which exits from the machine may be shunted aside, later to be re-melted and recycled or discarded. Thereafter, operation may be automatic if desired.

The air-curtain booster blowers 108 (FIGS. 1, 3 and 4), 112 (FIG. 4) for controlling temperatures of the 3-D patterned forming surfaces 274 of the revolving upper and lower mold belts have high and low operating speeds as explained above. The discharge mouth 358 of the upper blower 108 includes a plurality of internally-located, manually-adjustable aimable vanes, a few of which are indicated at 359 (FIG. 1) for directing heated or ambient-temperature or cooled air flow perpendicular (90°) to the revolving mold surfaces, as shown by arrows 360, or at suitable angle such as 45°, as shown by arrows 361, toward the exit end. This 45° angle is oriented counter to the mold belt's return travel 52. It appears that 45° orientation as shown by arrows 361 is about the optimum angle but a range of adjustment from about 65° to about 45° relative to the return travel direction is usually suitable.

The air-distribution plenum 114 (FIG. 4) has a discharge mouth 362 (FIG. 4) with internally-located, manually-adjustable vanes 359 which can be accessed for adjustment by pulling out the roller-drawer 200 (FIGS. 8 and 9). These adjustable vanes 359 may be aimed for directing heated or ambient-temperature or cooled air flow 360 or 361 toward the revolving 3-D patterned forming surface 274 (FIG. 7) of the revolving lower mold belt 28. This directed air flow 360 or 361 may be perpendicular (90°) or may be inclined at an angle relative to return travel direction 54 in the range from 65° to 45° toward the exit end, thereby being oriented counter to the lower mold belt's return travel 54.

If manual control of machine 20 is desired, such manual controls may include: "HEAT" ON/OFF switches for both top and bottom belts; "BLOWER" ON/OFF, LOW and HIGH for both top and bottom belts; "TOP CARRIAGE" UP/DOWN; "VACUUM" ON/OFF; "AIR-FILM BLOWERS" ON/OFF for controlling blowers 258, 259 (FIG. 7) for both top and bottom belts; keypads for entering various control parameters such as explained above; plus a keypad 338 for setting "X-AXIS" operating distance of entrance 30 (FIGS. 1 and 1A) from the heated thermoplastic feeding means 58, with an X-axis position control switch 340. The X direction is oriented toward and away from the feeding means 58, and the electric screw jack 80 (FIGS. 1 and 1A) is the X-axis driver. The front-back electric screw jack 90 (FIG. 3) may be considered a Y-axis driver, and the lift electric screw jack 138 (FIG. 6) may be considered a Z-axis driver. Thus, a Y-axis control switch 342 and Y-axis control data entry keypad 344 may be included. A top-carriage up/down switch 346 and a keypad 348 for entering control data for the lift screw jack 138 may be considered as Z-axis controls.

Appropriate X, Y, Z settings for each product P may be programmed. In the area 352 there may be tension controls with switches for controlling tension in both top and bottom belts. A suitable tension is about 25 to 27 pounds per inch of belt width. Thus, for a belt 27 inches wide, the total tension force is about 675 to 730 pounds. In panel area 352, a recording counter may totalize belt travel for indicating footages of one or more products P which have been produced since start-up. Also, the area 352 may include various signal lamps for alerting the operator to various operating conditions of the machine 20.

An emergency stop light 350 indicates that one of the emergency switches 139 has been actuated. An emergency re-set button 351 must be re-set before again running the machine.

For cooling electronic components and circuits within the housing 322, a centrifugal blower 370 (FIGS. 2A and 4) is connected via duct 372 (FIG. 4) with the back ends of the two hollow support beams 324. As shown by dashed arrows 374, cooling air proceeds from conduit 372 into and forwardly within these hollow beams 324, which thereby serve as dual cooling conduits for carrying cooling air toward both ends of the control housing 322. There are discharge slots as indicated by cooling flow arrows 376 in the front ends of these two hollow beams 324 aiming the cooling air flow 376 into the interior of the housing 322 for cooling electronic components and circuits therein.

Examples of suitable operating temperatures for various thermoplastic materials are set forth below, wherein the temperature of the heated thermoplastic extrudate material 56 is listed first. The data are in degrees Fahrenheit:

| Example | Extrudate Temperature | Upper Mold Surface Temperature | Lower Mold Surface Temperature |
|---------|----------------------|-------------------------------|-------------------------------|
| I       | 360                  | 173                           | 174                           |
| II      | 400                  | 181                           | 184                           |
| III     | 402                  | 183                           | 180                           |
| IV      | 410                  | 193                           | 199                           |

The mold belt 3-D forming surfaces 274 are at a temperature T2 considerably more than 25° F. above room temperature of 75° F.; nevertheless, they exert a chilling action to the extrudate, since the mold belt surfaces are at a considerable temperature differential ΔT below the extrudate temperature T1 of the heated thermoplastic material 56. For example, the respective differentials for Examples I, II, III and IV are: (I) 187° and 186° F. (top and bottom); (II) 219° and 216° F. (top and bottom); (III) 219° and 222° F. (top and bottom); and (IV) 217° and 211° F. (top and bottom).

It is seen that the temperature differentials expressed in °F. are at least more than the temperatures in °F. of the revolving mold surfaces 274 as they approach the entrance 30 in their respective return travels 52 and 54. By operating with somewhat lower temperatures of the revolving mold surfaces in the range of about 110° F. to about 140° F. even greater chilling effect and faster production can be achieved depending upon the glass-transition temperature of the thermoplastic material 56 and the "trigger point" temperature of any foaming agents being used, always aiming for optimum aesthetics and optimum product qualities and characteristics. For 3-D forming of thermoplastic polyvinyl chloride materials, it appears that using revolving mold surfaces 274 at temperatures within this range is advantageous. The thermoplastic material content of products P may be foamed to provide predetermined densities less than the densities of the unfoamed thermoplastic material. Control of temperatures of revolving mold surfaces is important for achieving aesthetic appearance of the outer skin of products P having content including foamed thermoplastic material.

As a convenient reference, densities of foamed thermoplastic materials are expressed in terms of their density compared with the density (specific gravity) of an equal volume of water at room temperature taken as unity (1.0). In various products P, the objective may be to achieve foamed densities and or strengths which are comparable with the densities and/or strengths of natural products being simulated. For example, eastern white pine has a density of about 0.4; longleaf pine has a density of about 0.64; redwood has a density of about 0.44; white oak has a density of about 0.71; and other types of oak have densities approaching 0.8. Thus, the heated thermoplastic material 56 may be foamed for producing products P having densities for example in a range from about 0.9 to about 0.4 compared with density of an equal volume of water at room temperature taken as unity (1.0). Such foamed densities of wood-simulating products P enable them to be nailed, sawn, drilled, and screw-attached like wood products, except that the products P are not likely to split, even when nailed near an edge or end. Moreover, readily available hardware is designed for use with wood products of such densities. Therefore, these products P are quite suitable for use with presently existing hardware. In addition, products P may be formulated to be durably weather-resistant. Also, products P may include colorants so they do not need painting and may be formulated for providing a higher fire rating than natural wood products being simulated.

Since other changes and modifications varied to fit particular operating requirements and environments will be recognized by those skilled in the art, the invention is not considered limited to the examples chosen for purposes of illustration, and includes all changes and modifications which do not constitute a departure from the true spirit and scope of this invention as claimed in the following claims and equivalents of claimed elements.

We claim:

1. A continuous 3-D forming machine for forming three-dimensional products from thermoplastic material having upper and lower carriages defining an entry and an exit located at opposite ends of the machine and having two upper and two lower cylindrical, drum-shaped pulleys rotatably mounted respectively at entry and exit ends of the upper carriage and at entry and exit ends of the lower carriage and having upper and lower endless, flexible, mold belts removably mountable on and revolvable respectively around the upper and lower carriages and having drive means for revolving the upper and lower mold belts respectively around the upper and lower carriages with said upper and lower mold belts being juxtaposable along a pass line between said carriages for defining at least one travelling mold channel continuously moving from said entry to said exit for continuous three-dimensional forming of heated thermoplastic material introduced into said entry with resultant 3-D formed products proceeding out from said exit, said machine, wherein:

an exit end portion of the upper carriage is extendable and retractable in a direction toward and away from a main portion of the upper carriage, said direction of extension and retraction being parallel with the pass line;

said exit end portion of the upper carriage has said upper exit pulley rotatably mounted thereon;

an exit end portion of the lower carriage is extendable and retractable in a direction toward and away from a main portion of the lower carriage, said direction of extension and retraction being parallel with the pass line;

said exit end portion of the lower carriage has said lower exit pulley rotatably mounted thereon;

said machine includes removable upper and lower spanning bridges;

said upper spanning bridge is insertable between said exit end portion of the upper carriage in an extended position and said main portion of the upper carriage;

said upper spanning bridge in its inserted position is located in alignment with a top area of said exit end portion and a top area of said main portion of the upper carriage for supporting the revolving upper mold belt in its return travel from the top area of said extended exit end portion to the top area of said main portion of the upper carriage;

said lower spanning bridge is insertable between said exit end portion of the lower carriage in an extended position and said main portion of the lower carriage; and said lower spanning bridge in its inserted position is located in alignment with a top area of said exit end portion and a top area of said main portion of the lower carriage for supporting the revolving lower mold belt in its travel along the pass line from the top area of said main portion to the top area of said extended exit end portion of the lower carriage.

2. A continuous 3-D forming machine as claimed in claim 1, in which:

said upper spanning bridge includes a plurality of freely rotatable rollers for supporting the revolving upper belt in said return travel; and said lower spanning bridge includes a platen for supporting the revolving lower belt in said travel along the pass line.

3. A continuous 3-D forming machine as claimed in claim 1, in which:

said exit end portion of the upper carriage is extendable and retractable a distance of at least twenty-five inches in said direction parallel with the pass line;

said exit end portion of the lower carriage is extendable and retractable a distance of at least twenty-five inches in said direction parallel with the pass line;

said machine includes at least two removable upper spanning bridges;

one of said upper spanning bridges is of greater length and the other is of lesser length for selectable insertion into the upper carriage between said exit end portion of the upper carriage and said main portion of the upper carriage when the exit end portion of the upper carriage is in respective positions of greater or lesser extension;

said machine includes at least two removable lower spanning bridges;

one of said lower spanning bridges is of greater length and the other is of lesser length for selective insertion into the lower carriage between said exit end portion of the lower carriage and said main portion of the lower carriage when the exit end portion of the lower carriage is in respective positions of greater or lesser extension.

4. A continuous 3-D forming machine for forming three-dimensional products from thermoplastic material having upper and lower carriages defining an entry and an exit located at opposite ends of the machine and having two upper and two lower cylindrical, drum-shaped pulleys rotatably mounted respectively at entry and exit ends of the upper carriage and at entry and exit ends of the lower carriage and having upper and lower endless, flexible, mold belts removably mountable on and revolvable respectively around the upper and lower carriages and having drive means for revolving the upper and lower mold belts respectively around the upper and lower carriages with said upper and lower mold belts being juxtaposable along a pass line between said carriages for defining at least one travelling mold channel continuously moving from said entry to said exit for continuous three-dimensional forming of heated thermoplastic material introduced into said entry with resultant 3-D formed products proceeding out from said exit, said machine comprising:

an exit end portion of the upper carriage which is extendable and retractable in a direction toward and away from a main portion of the upper carriage, said direction of extension and retraction being parallel with the pass line;

said exit end portion of the upper carriage having said upper exit pulley rotatably mounted thereon;

an exit end portion of the lower carriage which is extendable and retractable in a direction toward and away from a main portion of the lower carriage, said direction of extension and retraction being parallel with the pass line;

said exit end portion of the lower carriage having said lower exit pulley rotatably mounted thereon;

said upper carriage is movable upwardly and downwardly relative to said lower carriage;

said main portion of the lower carriage has a plurality of mounting positions along a top of a rear side and along a top of a front side of said main portion of the lower carriage;

a plurality of spacers are removably mountable at said mounting positions for interacting with a rear side and a front side of said main portion of the upper carriage for limiting downward motion of the upper carriage toward the lower carriage; and said spacers and their mounting positions are coordinated with configurations of shoulders extending along margins of both mold belts when shoulders on the revolving upper mold belt are in engaged relation with opposed shoulders on the revolving lower mold belt along the pass line for defining at least one travelling mold channel between the engaged shoulders of the revolving upper and lower mold belts for preventing flash of heated thermoplastic material between the engaged shoulders while avoiding undue pressure such as might cause undesired compression distortion of engaged shoulders of the revolving upper and lower mold belts.

5. A continuous 3-D forming machine for forming three-dimensional products from thermoplastic material having upper and lower carriages defining an entry and an exit located at opposite ends of the machine and having two upper and two lower cylindrical, drum-shaped pulleys rotatably mounted respectively at entry and exit ends of the upper carriage and at entry and exit ends of the lower carriage and having upper and lower endless, flexible, mold belts removably mountable on and revolvable respectively around the upper and lower carriages and having drive means for revolving the upper and lower mold belts respectively around the upper and lower carriages with said upper and lower mold belts being juxtaposable along a pass line between said carriages for defining at least one travelling mold channel continuously moving from said entry to said exit for continuous three-dimensional forming of heated thermoplastic material introduced into said entry with resultant 3-D formed products proceeding out from said exit, said machine comprising:

an exit end portion of the upper carriage which is extendable and retractable in a direction toward and away from a main portion of the upper carriage, said direction of extension and retraction being parallel with the pass line;

said exit end portion of the upper carriage has said upper exit pulley rotatably mounted thereon;

an exit end portion of the lower carriage which is extendable and retractable in a direction toward and away from a main portion of the lower carriage, said direction of extension and retraction being parallel with the pass line;

said exit end portion of the lower carriage has said lower exit pulley rotatably mounted thereon;

said machine includes a lower exit pulley stabilizer, in which:

an elongated guide member extends in a direction parallel with the pass line;

said elongated guide member is rigidly attached to one of said portions of the lower carriage with said elongated guide member projecting toward the other portion of the lower carriage; and guide means mounted on said other portion of the lower carriage continually engage said elongated guide member in all extended and retracted positions of said exit end portion for stabilizing said exit end portion of the lower carriage relative to said main portion of the lower carriage in all extended and retracted positions.

6. A continuous 3-D forming machine as claimed in claim 5, in which:

said elongated guide member is rigidly attached to said main portion of the lower carriage and projects toward said exit end portion of the lower carriage; and said guide means are mounted on said exit end portion of the lower carriage.

7. A continuous 3-D forming machine for forming three-dimensional products from thermoplastic material having upper and lower carriages defining an entry and an exit located at opposite ends of the machine and having two upper and two lower cylindrical, drum-shaped pulleys rotatably mounted respectively at entry and exit ends of the upper carriage and at entry and exit ends of the lower carriage and having upper and lower endless, flexible, mold belts removably mountable on and revolvable respectively around the upper and lower carriages and having drive means for revolving the upper and lower mold belts respectively around the upper and lower carriages with said upper and lower mold belts being juxtaposable along a pass line between said carriages for defining at least one travelling mold channel continuously moving from said entry to said exit for continuous three-dimensional forming of heated thermoplastic material introduced into said entry with resultant 3-D formed products proceeding out from said exit, said machine comprising:

a removable lower spanning bridge;

said lower spanning bridge is insertable between said exit end portion of the lower carriage in an extended position and said main portion of the lower carriage for guiding a revolving lower mold belt;

said machine includes an electric screw jack mounted within said main portion of the lower carriage;

a feedscrew extends from said electric screw jack to said exit end portion of the lower carriage;

a distal end of said feedscrew is connected to said exit end portion of the lower carriage;

said electric screw jack is energizable for extending and retracting said exit end portion of the lower carriage;

sensor means are provided for sensing presence of a lower spanning bridge between the exit end portion of the lower carriage in an extended position and the main portion of the lower carriage; and said sensor means are electrically associated with said electric screw jack for preventing inadvertent energization of said electric screw jack in a retraction direction whenever a lower spanning bridge is in said location.

8. A continuous 3-D forming machine for forming three-dimensional products from thermoplastic material having upper and lower carriages defining an entry and an exit located at opposite ends of the machine and having two upper and two lower cylindrical, drum-shaped pulleys rotatably mounted respectively at entry and exit ends of the upper carriage and at entry and exit ends of the lower carriage and having upper and lower endless, flexible, mold belts removably mountable on and revolvable respectively around the upper and lower carriages and having drive means for revolving the upper and lower mold belts respectively around the upper and lower carriages with said upper and lower mold belts being juxtaposable along a pass line between said carriages for defining at least one travelling mold channel continuously moving from said entry to said exit for continuous three-dimensional forming of heated thermoplastic material introduced into said entry with resultant 3-D formed products proceeding out from said exit, said machine in which:

said upper and lower carriages have front and rear sides;

said upper and lower endless, flexible mold belts each have front and rear edges;

rear upper edge-guide rollers are mounted in first predetermined positions at spaced intervals along the rear side of the upper carriage for rolling guidance of the rear edge of the upper mold belt in revolving around the upper carriage;

at least one rear upper edge-guide roller is mounted on a rear side of the exit end portion of the upper carriage;

rear lower edge-guide rollers are mounted in second predetermined positions at spaced intervals along the rear side of the lower carriage for rolling guidance of the rear edge of the lower mold belt in revolving around the lower carriage;

at least one rear lower edge-guide roller is mounted on a rear side of the exit end portion of the lower carriage;

front upper edge-guide rollers are removably mounted at spaced intervals along the front side of the upper carriage for rolling guidance of the front edge of the upper mold belt in revolving around the upper carriage;

at least one front upper edge-guide roller is removably mounted on a front side of the exit end of the upper carriage;

front lower edge-guide rollers are removably mounted at spaced intervals along the front side of the lower carriage for rolling guidance of the front edge of the lower mold belt in revolving around the lower carriage;

at least one front lower edge-guide roller is removably mounted on a front side of the exit end of the lower carriage;

said front upper and front lower edge-guide rollers are removable from the front sides of the upper and lower carriages for facilitating removal of the upper and lower mold belts from the upper and lower carriages;

the machine includes a drawer frame which is movable outwardly from its operating position and which is movable inwardly to its operating position;

said drawer frame in its operating position is located below the lower belt revolving around the lower carriage;

said drawer frame includes a plurality of support rollers arranged for supporting the lower belt in a region below the lower carriage as the lower belt revolves around the lower carriage;

at least one rear lower edge-guide roller is mounted on a rear side member of said drawer frame; and at least one removable front lower edge-guide roller is mounted on a front side member of said drawer frame.

9. A continuous 3-D forming machine as claimed in claim 8, in which:

said drawer frame is arranged for supporting the lower mold belt during installation of the lower mold belt onto the lower carriage when the exit end portion of the lower carriage is in retracted position and also for supporting the lower mold belt during removal of the lower mold belt from the lower carriage when the exit end portion of the lower carriage is in retracted position.

10. A continuous 3-D forming machine for forming three-dimensional products from thermoplastic material having upper and lower carriages defining an entry and an exit located at opposite ends of the machine and having two upper and two lower cylindrical, drum-shaped pulleys rotatably mounted respectively at entry and exit ends of the upper carriage and at entry and exit ends of the lower carriage and having upper and lower endless, flexible, mold belts removably mountable on and revolvable respectively around the upper and lower carriages and having drive means for revolving the upper and lower mold belts respectively around the upper and lower carriages with said upper and lower mold belts being juxtaposable along a pass line between said carriages for defining at least one travelling mold continuously moving from said entry to said exit for continuous three-dimensional forming of heated thermoplastic material introduced into said entry with resultant 3-D formed products proceeding out from said exit, said machine comprising:

- an exit end portion of the upper carriage extendable and retractable in a direction toward and away from a main portion of the upper carriage, said direction of extension and retraction being parallel with the pass line;
- said exit end portion of the upper carriage having said upper exit pulley rotatably mounted thereon;
- an exit end portion of the lower carriage extendable and retractable in a direction toward and away from a main portion of the lower carriage, said direction of extension and retraction being parallel with the pass line;
- said exit end portion of the lower carriage having said lower exit pulley rotatably mounted thereon;
- an upper spanning bridge;
- a lower spanning bridge;
- said upper spanning bridge being removably insertable between said exit end portion of the upper carriage and said main portion of the upper carriage for guiding an upper mold belt revolving around the upper carriage when said exit end portion of the upper carriage is extended; and
- said lower spanning bridge being removably insertable between said exit end portion of the lower carriage and said main portion of the lower carriage for guiding a lower mold belt revolving around the lower carriage when said exit end portion of the lower carriage is extended.

11. A continuous 3-D forming machine for forming three-dimensional products from thermoplastic material having upper and lower carriages defining an entry and an exit located at opposite ends of the machine and having two upper and two lower cylindrical, drum-shaped pulleys rotatably mounted respectively at entry and exit ends of the upper carriage and at entry and exit ends of the lower carriage and having upper and lower endless, flexible, mold belts removably mountable on and revolvable respectively around the upper and lower carriages and having drive means for revolving the upper and lower mold belts respectively around the upper and lower carriages with said upper and lower mold belts being juxtaposable along a pass line between said carriages for defining at least one travelling mold continuously moving from said entry to said exit for continuous three-dimensional forming of heated thermoplastic material introduced into said entry with resultant 3-D formed products proceeding out from said exit, in which:

- an exit end portion of the upper carriage extendable and retractable in a direction toward and away from a main portion of the upper carriage, said direction of extension and retraction being parallel with the pass line;
- said exit end portion of the upper carriage having said upper exit pulley rotatably mounted thereon;
- an exit end portion of the lower carriage extendable and retractable in a direction toward and away from a main portion of the lower carriage, said direction of extension and retraction being parallel with the pass line;
- said exit end portion of the lower carriage having said lower exit pulley rotatably mounted thereon;
- the upper carriage is movable upwardly and downwardly relative to the lower carriage;
- an electric screw jack raises and lowers the upper carriage;
- the upper mold belt has shoulders extending along its rear and front margins;
- the lower mold belt has shoulders extending along its rear and front margins;
- said electric screw jack raises the upper carriage for enabling removal of the upper and lower mold belts from the upper and lower carriages when said exit end portions of the upper and lower carriages are retracted;
- said electric screw jack lowers the upper carriage for placing the rear and front shoulders of the upper and lower mold belts in juxtaposed relationship; and
- positioning mechanisms for the upper carriage when the upper carriage is in its lowered position hold the upper carriage in accurately spaced parallel relation with the lower carriage for pressing together the rear margins of the upper and lower mold belts and for pressing together the front margins of the upper and lower mold belts with sufficient pressure between the contacting rear shoulders and with sufficient pressure between the contacting front shoulders for preventing hot thermoplastic material in the travelling mold from flashing out between the contacting rear shoulders and for preventing hot thermoplastic material in the travelling mold from flashing out between the contacting front shoulders.

12. A continuous 3-D forming machine claimed in claim 11, in which:

- a drawer frame in the machine is movable into an extended position wherein the drawer frame in the extended position may be used for supporting the lower mold belt during its installation onto the lower carriage and in the extended position also may be used for supporting the lower mold belt during its removal from the lower carriage.

13. A continuous 3-D forming machine claimed in claim 12, in which:

- the drawer frame includes mechanism for supporting a travelling portion of a revolving lower belt in a region wherein said travelling portion of the lower belt is returning from the exit end to the entry end of the machine; and
- the drawer frame is movable into an operating position wherein said mechanism is engageable with said portion of a lower belt.

* * * * *